(12) United States Patent
Figueiredo et al.

(10) Patent No.: US 12,494,085 B2
(45) Date of Patent: Dec. 9, 2025

(54) TECHNOLOGIES FOR ANALYZING BEHAVIORS OF OBJECTS OR WITH RESPECT TO OBJECTS BASED ON STEREO IMAGERIES THEREOF

(71) Applicant: Intelligent Security Systems Corporation, Woodbridge, NJ (US)

(72) Inventors: Aluisio Figueiredo, Freehold, NJ (US); Roman Jarkoi, Sunrise, FL (US); Oleg Vladimirovich Stepanenko, Balashikha (RU); Valery Arzumanov, Moscow (RU)

(73) Assignee: Intelligent Security Systems Corporation, Woodbridge, NJ (US)

( * ) Notice: Subject to any disclaimer, the term of this patent is extended or adjusted under 35 U.S.C. 154(b) by 258 days.

(21) Appl. No.: 17/926,322

(22) PCT Filed: May 16, 2021

(86) PCT No.: PCT/US2021/032649
§ 371 (c)(1),
(2) Date: Nov. 18, 2022

(87) PCT Pub. No.: WO2021/236468
PCT Pub. Date: Nov. 25, 2021

(65) Prior Publication Data
US 2023/0237850 A1  Jul. 27, 2023

Related U.S. Application Data

(60) Provisional application No. 63/027,215, filed on May 19, 2020.

(51) Int. Cl.
*G06V 40/20* (2022.01)
*G06T 7/246* (2017.01)
(Continued)

(52) U.S. Cl.
CPC .............. *G06V 40/20* (2022.01); *G06T 7/251* (2017.01); *G06T 7/285* (2017.01); *G06V 10/82* (2022.01);
(Continued)

(58) Field of Classification Search
CPC ................... G06T 7/285; G06T 7/251; G06T 2207/30196; G06T 19/006; G06T 19/00;
(Continued)

(56) References Cited

U.S. PATENT DOCUMENTS 6,847,957 B1 *  1/2005  Morley ................. G06Q 10/10
706/47
9,244,924 B2 *  1/2016  Cheng ................... G06F 16/787
(Continued)

FOREIGN PATENT DOCUMENTS

CN          104461525 A  *  3/2015
CN          118821792 A  *  10/2024

OTHER PUBLICATIONS

Singh, Alok et al. "A Comprehensive Review on Recent Methods and Challenges of Video Description", Cornell University, Dec. 1, 2020 (Year: 2020).*

(Continued)

*Primary Examiner* — Aaron W Carter
*Assistant Examiner* — Alejandro Hernandez
(74) *Attorney, Agent, or Firm* — Dentons US LLP

(57) ABSTRACT

This disclosure enables various technologies for analyzing behaviors of objects or with respect to objects based on stereo imageries thereof. For example, such analysis may be useful in enforcement of certain actions by objects or with respect to objects, surveillance of objects or with respect to objects, or other situations involving analyzing behaviors of objects or with respect to objects.

32 Claims, 21 Drawing Sheets

(51) Int. Cl.
*G06T 7/285* (2017.01)
*G06V 10/82* (2022.01)
*G06V 20/52* (2022.01)
*G06V 20/64* (2022.01)
*G08B 21/24* (2006.01)

(52) U.S. Cl.
CPC .............. *G06V 20/52* (2022.01); *G06V 20/64* (2022.01); *G06V 40/28* (2022.01); *G08B 21/245* (2013.01); *G06T 2207/30196* (2013.01)

(58) Field of Classification Search
CPC ...................... G06T 13/40; G06T 13/20; G06T 2207/20084; G06T 15/10; G06T 17/00; G06V 20/52; G06V 20/64; G06V 40/28; G06V 10/82; G06V 40/20; G06V 20/20; G06V 10/70; G06V 10/40; G08B 21/245; B25J 11/0005; G06F 3/017; G06F 3/01; G06F 3/011; G06F 3/012; G06F 16/3329; G06F 21/30; G06K 9/00335; G06K 9/00221; G06K 9/00288
See application file for complete search history.

(56) References Cited

U.S. PATENT DOCUMENTS

| | | | | |
|---|---|---|---|---|
| 9,507,768 | B2* | 11/2016 | Cobb | G06F 40/289 |
| 10,482,181 | B1* | 11/2019 | Rubin | G06N 5/02 |
| 11,182,924 | B1* | 11/2021 | Akbas | A61B 5/7405 |
| 11,238,401 | B1* | 2/2022 | Guan | G06F 3/04842 |
| 11,373,331 | B2* | 6/2022 | Huelsdunk | G06V 10/82 |
| 11,826,636 | B2* | 11/2023 | Argiro | A63F 13/285 |
| 11,868,956 | B1* | 1/2024 | Dillon | G06Q 10/087 |
| 12,250,362 | B1* | 3/2025 | Berme | H04N 13/279 |
| 2006/0149553 | A1* | 7/2006 | Begeja | G10L 15/22 704/E15.04 |
| 2007/0285419 | A1 | 12/2007 | Givon | |
| 2010/0201783 | A1 | 8/2010 | Ueda | |
| 2012/0287243 | A1 | 11/2012 | Parulski | |
| 2012/0301013 | A1 | 11/2012 | Gu | |
| 2015/0000026 | A1* | 1/2015 | Clements | G06F 3/04886 4/443 |
| 2015/0248917 | A1* | 9/2015 | Chang | G11B 27/031 386/282 |
| 2017/0035330 | A1* | 2/2017 | Bunn | A61B 5/1124 |
| 2017/0262584 | A1* | 9/2017 | Gallix | G06N 20/00 |
| 2017/0275023 | A1 | 9/2017 | Harris | |
| 2018/0101966 | A1* | 4/2018 | Lee | H04N 21/6587 |
| 2020/0129109 | A1* | 4/2020 | Bunn | A61B 5/7264 |
| 2020/0193615 | A1* | 6/2020 | Goncharov | G06T 7/20 |
| 2020/0296249 | A1* | 9/2020 | Parian | H04N 1/00827 |
| 2020/0311395 | A1* | 10/2020 | Kim | G06V 40/23 |
| 2020/0394364 | A1* | 12/2020 | Venkateshwaran | G06F 40/117 |
| 2020/0401617 | A1* | 12/2020 | Spiegel | G06F 16/587 |
| 2021/0209169 | A1* | 7/2021 | Sundararajan | G06F 8/30 |
| 2021/0279475 | A1* | 9/2021 | Tusch | H04L 63/0861 |
| 2022/0222849 | A1* | 7/2022 | Zhang | G06T 7/74 |
| 2022/0308359 | A1* | 9/2022 | Karafin | A63F 13/213 |
| 2022/0335720 | A1* | 10/2022 | Chang | H04N 5/2224 |
| 2024/0148464 | A1* | 5/2024 | Freeman | A61M 16/04 |
| 2024/0225579 | A1* | 7/2024 | Nandi | A61B 6/037 |
| 2024/0232539 | A1* | 7/2024 | Venkateshwaran | G06N 3/044 |

OTHER PUBLICATIONS

Extended European Search Report Apr. 25, 2024 in related EP Application No. 21809882.0 filed May 16, 2021 (10 pages).
Troung Anh Minh et al., "Structured RNN for human interaction", IET Computer Vision, The Institution of Engineering and Technology, Michael Faraday House, Six Fllls Way, Stevenage, Herts. SG1 2AY, UK, vol. 12, No. 6 Sep. 1, 2018, pp. 817-825, XP006079205.
Anonymous: "Human-Object Interaction Detection I Paper with Code", Apr. 11, 2024, XP093150665, retrieved from the internet: URL:https://paperswithcode.com/task/huma-object-interaction-detection, Apr. 11, 2024 (9 pages).
Nina Wiedemann et al., "A Tracking System for Baseball Game Reconstruction", ARXIV.org, Cornell University Library, 201 Olin Library Cornell University Ithaca, NY 14853, Mar. 8, 2020, XP081617369 (27 pages).
Hand, A survey of 3D interaction techniques. Computer graphics forum. Vol. 16. No. 5. Oxford, UK and Boston, USA: Blackwell Publishers, 1997. Jun. 28, 2008 (Jun. 28, 2008) Retrieved on Jul. 12, 2021 (Jul. 12, 2021) from https://onlinelibrary.wiley.com/doi/abs/10.1111/1467-8659.00194.
International Search Report and Written Opinion mailed on Aug. 17, 2021 in related International Application PCT/US2021/032649 filed May 16, 2021 (14 pages).

* cited by examiner

200

```
┌─────────────────────────────────────────────────────────────────────────┐
│ Accessing, via a processor, in real-time, a stereo imagery of an area   │
│ including a first object and a second object engaging with the first    │
│ object                                                                   │
│                                                                          │
│                                  202                                     │
└─────────────────────────────────────────────────────────────────────────┘
                                    │
                                    ▼
┌─────────────────────────────────────────────────────────────────────────┐
│ Forming, via the processor, in real-time, a reconstruction of the       │
│ second object in the area based on the stereo imagery, where the        │
│ reconstruction including a 3D area model and a 3D skeletal model within │
│ the 3D area model, where the 3D area model simulating the area, where   │
│ the 3D skeletal model simulating the second object in the area          │
│                                                                          │
│                                  204                                     │
└─────────────────────────────────────────────────────────────────────────┘
                                    │
                                    ▼
┌─────────────────────────────────────────────────────────────────────────┐
│ Identifying, via the processor, in real-time, a set of virtual          │
│ movements of the 3D skeletal model in the 3D area model, where the set  │
│ of virtual movements simulating the second object engaging with the     │
│ first object                                                             │
│                                                                          │
│                                  206                                     │
└─────────────────────────────────────────────────────────────────────────┘
                                    │
                                    ▼
┌─────────────────────────────────────────────────────────────────────────┐
│ Identifying, via the processor, in real-time, a set of atomic movements │
│ of the 3D skeletal model corresponding to the set of virtual movements  │
│                                                                          │
│                                  208                                     │
└─────────────────────────────────────────────────────────────────────────┘
                                    │
                                    ▼
┌─────────────────────────────────────────────────────────────────────────┐
│ Identifying, via the processor, in real-time, an event defined by the   │
│ set of atomic movements                                                  │
│                                                                          │
│                                  210                                     │
└─────────────────────────────────────────────────────────────────────────┘
                                    │
                                    ▼
┌─────────────────────────────────────────────────────────────────────────┐
│ Taking, via the processor, in real-time, an action responsive to the    │
│ event being identified.                                                  │
│                                                                          │
│                                  212                                     │
└─────────────────────────────────────────────────────────────────────────┘
```

FIG. 2

| Employee | Telephone | Subdivision | Total violated |
|---|---|---|---|
| Fedorov Mikhail Sergeevich | 8 (812) 380-32-83 | Distribution shop | 5 |
| Baburin Ivan Alekseevich | 8 (812) 284-12-39 | Packing shop | 1 |
| Razova Anna Yurevna | 8 (812) 380-32-83 | Assembly shop | 34 |
| Fedorov Mikhail Sergeevich | 8 (812) 380-32-83 | Repair shop | 4 |
| Smolnikov Alexander Olegovich | 8 (812) 380-32-83 | Assembly shop | 7 |
| Fedorov Mikhail Sergeevich | 8 (812) 284-12-39 | Household pantry | 1 |
| Baburin Ivan Alekseevich | 8 (812) 380-32-83 | Distribution shop | 34 |
| Razova Anna Yurevna | 8 (812) 284-12-39 | Assembly shop | 12 |
| Fedorov Mikhail Sergeevich | 8 (812) 380-32-83 | Repair shop | 4 |
| Smolnikov Alexander Olegovich | 8 (812) 284-12-39 | Distribution shop | 1 |
| Razova Anna Yurevna | 8 (812) 284-12-39 | Assembly shop | 34 |
| Fedorov Mikhail Sergeevich | 8 (812) 380-32-83 | Repair shop | 4 |

TECHNOLOGIES FOR ANALYZING BEHAVIORS OF OBJECTS OR WITH RESPECT TO OBJECTS BASED ON STEREO IMAGERIES THEREOF

CROSS-REFERENCE TO RELATED PATENT APPLICATION

This patent application claims a benefit of priority to PCT International Application PCT/US2021/032649 filed 16 May 2021; which claims a benefit of priority to U.S. Provisional Patent Application 63/027,215 filed 19 May 2020; each of which is herein incorporated by reference in its entirety for all purposes.

TECHNICAL FIELD

This disclosure relates to various technologies for analyzing behaviors of objects or with respect to objects based on stereo imageries thereof.

BACKGROUND

Various sanitary norms became common during a currently ongoing COVID19 pandemic. For example, these norms include hand sanitization (e.g., washing a pair of hands with a soap, rubbing a pair of hands with a hand sanitizer), avoidance of close contact (e.g., kissing, hugging, handshaking), and others. However, enforcing these sanitary norms is technologically difficult, time consuming, and manually laborious. For example, enforcing hand sanitization before certain activities (e.g., handling a food item, interacting with a patient, touching a surface) or entry into certain defined spaces (e.g., a clean room, an operating room, a work area, an elevator) is technologically difficult, time consuming, and manually laborious. Likewise, enforcing avoidance of close contact within certain defined spaces (e.g., a nursing home, a forced confinement area, a classroom, a lunchroom, a dining area, a museum) is technologically difficult, time consuming, and manually laborious.

SUMMARY

This disclosure enables various technologies for analyzing behaviors of objects or with respect to objects based on stereo imageries thereof. For example, such analysis may be useful in enforcement of certain actions by objects or with respect to objects, surveillance of objects or with respect to objects, enforcement of sanitary norms by objects or with respect to objects, or other situations involving analyzing behaviors of objects or with respect to objects. For example, these sanitary norms may include hand sanitization (e.g., washing a pair of hands with a soap, rubbing a pair of hands with a hand sanitizer), avoidance of close contact (e.g., kissing, hugging, handshaking), and others. For example, some of these technologies may be useful in enforcing hand sanitization before certain activities (e.g., handling a food item, interacting with a patient, touching a surface) or entry into certain defined spaces (e.g., a clean room, an operating room, a work area, an elevator). Likewise, some of these technologies may be useful in enforcing avoidance of close contact within certain defined spaces (e.g., a nursing home, a forced confinement area, a classroom, a lunchroom, a dining area, a museum).

In an embodiment, a device comprises: a processor programmed to: access, in real-time, a stereo imagery of an area including a first object and a second object engaging with the first object; form, in real-time, a reconstruction of the second object in the area based on the stereo imagery, wherein the reconstruction including a 3D area model and a 3D skeletal model within the 3D area model, wherein the 3D area model simulating the area, wherein the 3D skeletal model simulating the second object in the area; identify, in real-time, a set of virtual movements of the 3D skeletal model in the 3D area model, wherein the set of virtual movements simulating the second object engaging with the first object; identify, in real-time, a set of atomic movements of the 3D skeletal model corresponding to the set of virtual movements; identify, in real-time, an event defined by the set of atomic movements; and take, in real-time, an action responsive to the event being identified.

In an embodiment, a method comprises: accessing, via a processor, in real-time, a stereo imagery of an area including a first object and a second object engaging with the first object; forming, via the processor, in real-time, a reconstruction of the second object in the area based on the stereo imagery, wherein the reconstruction including a 3D area model and a 3D skeletal model within the 3D area model, wherein the 3D area model simulating the area, wherein the 3D skeletal model simulating the second object in the area; identifying, via the processor, in real-time, a set of virtual movements of the 3D skeletal model in the 3D area model, wherein the set of virtual movements simulating the second object engaging with the first object; identifying, via the processor, in real-time, a set of atomic movements of the 3D skeletal model corresponding to the set of virtual movements; identifying, via the processor, in real-time, an event defined by the set of atomic movements; and taking, via the processor, in real-time, an action responsive to the event being identified.

DESCRIPTION OF DRAWINGS

FIG. 2 illustrates an embodiment of a flowchart for the device of FIG. 1 according to various principles of this disclosure.

FIG. 5 illustrates a screenshot of a GUI of an object directory (e.g., a staff directory) where each second object is listed on a row basis and has an identifier of each respective second object, a contact information of each respective second object, a department of each respective second object, and a count of events (e.g., an identification of an event, a non-identification of an event) of each respective second object according to principles of this disclosure.

DETAILED DESCRIPTION

Figure 1:
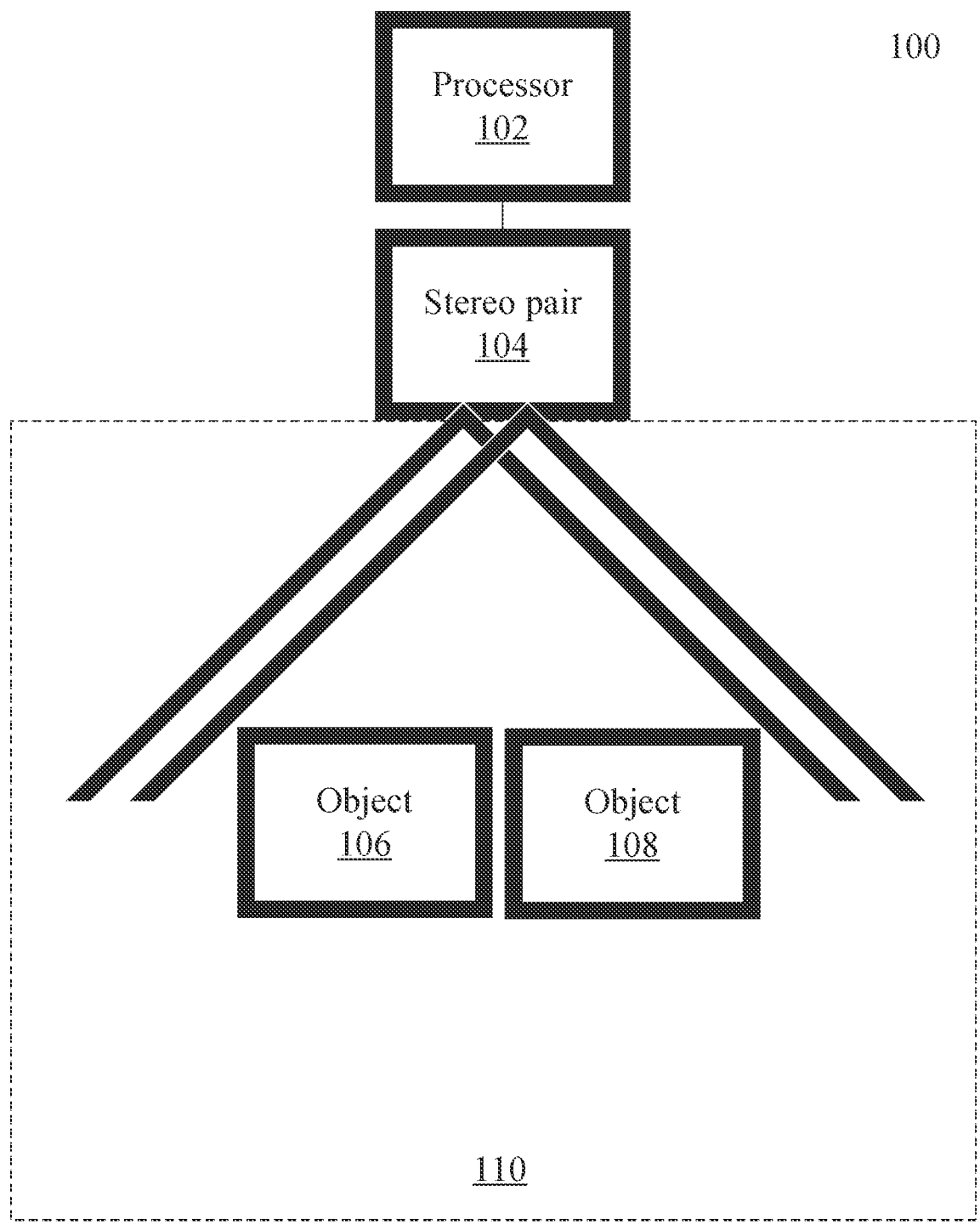
FIG. 1 illustrates an embodiment of a device for analyzing behaviors of objects or with respect to objects based on stereo imageries thereof according to various principles of this disclosure.

This disclosure enables various technologies for analyzing behaviors of objects or with respect to objects based on stereo imageries thereof. For example, such analysis may be useful in enforcement of certain actions by objects or with respect to objects, surveillance of objects or with respect to objects, enforcement of sanitary norms by objects or with respect to objects, or other situations involving analyzing behaviors of objects or with respect to objects. For example, these sanitary norms may include hand sanitization (e.g., washing a pair of hands with a soap, rubbing a pair of hands with a hand sanitizer), avoidance of close contact (e.g., kissing, hugging, handshaking), and others. For example, some of these technologies may be useful in enforcing hand sanitization before certain activities (e.g., handling a food item, interacting with a patient, touching a surface) or entry into certain defined spaces (e.g., a clean room, an operating room, a work area, an elevator). Likewise, some of these technologies may be useful in enforcing avoidance of close contact within certain defined spaces (e.g., a nursing home, a forced confinement area, a classroom, a lunchroom, a dining area, a museum).

This disclosure is now described more fully with reference to FIGS. 1-21, in which some embodiments of this disclosure are shown. This disclosure may, however, be embodied in many different forms and should not be construed as necessarily being limited to the embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms (e.g., two, three, four, five, six, seven, eight, nine, ten, tens, hundreds, thousands) as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements.

Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Features described with respect to certain embodiments may be combined in or with various some embodiments in any permutational or combinatory manner. Different aspects or elements of example embodiments, as disclosed herein, may be combined in a similar manner.

Although the terms first, second, can be used herein to describe various elements, components, regions, layers, or sections, these elements, components, regions, layers, or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

FIG. 1 illustrates an embodiment of a device for analyzing behaviors of objects or with respect to objects based on stereo imageries thereof according to various principles of this disclosure. In particular, a device 100 includes a processor 102 receiving a stereo imagery from a stereo pair 104 real-time imaging an area 110 containing a first object 106 and a second object 108.

The processor 102 can be any suitable processor. For example, the processor 102 can include a processing circuit, a digital circuit, an integrated circuit, an application specific integrated circuit, an application specific integrated processor, a microprocessor, a single core processor, a multicore processor, a graphics processing unit, a physics processing unit, a digital signal processor, a coprocessor, a network processor, a front-end processor, a field-programmable gate array, a programmable logic controller, a system-on-chip, or other suitable processors. For example, the processor 102 can be a single processor or a set of processors 102, whether local or remote from each other. The processor 102 can be programmed based on a set of executable instructions or an executable program (or other form of logic) stored in a memory (e.g., a flash memory, a cache memory) to which the processor 102 has access (e.g., random-access memory, processor cache). For example, the processor 102 can be included in a workstation, a tablet, a laptop, a desktop, a nettop, a PC-on-a stick, a next unit of computing (NUC) apparatus, a computer appliance, a server (e.g., hardware, virtual, web, application, database), a client (e.g., hardware, software), or other computing form factors.

The stereo pair 104 includes a pair of cameras (e.g., optical, thermal), which can be housed in a housing, positioned on a surface, or hosted on a frame (e.g., on a branch of a T-shaped frame, a U-shaped frame, a C-shaped frame, an X-shaped frame, a K-shaped frame, a Y-shaped frame), whether along a horizontal, vertical, or diagonal plane. Each camera of the pair of cameras has its own field of vision, which may be overlapping with each other, as shown in FIG. 1. For example, the stereo pair 104 can be embodied as a depth camera and a video camera synchronized with the depth camera, each with its own field of vision, which may be overlapping with each other, as shown in FIG. 1. For example, the stereo pair 104 can be embodied as a pair of IP cameras, each with its own field of vision, which may be overlapping with each other, as shown in FIG. 1. The stereo pair 104 can be local with (e.g., same housing, same building, same floor, same room) or remote from the processor 102.

The stereo pair 104 may include an artificial illumination source (e.g., a flash unit), a microphone, a sensor, a thermometer, a distance sensor, a proximity sensor, a motion sensor, a thermal sensor, a radar, a Lidar, a wind sensor, a rain sensor, a light sensor, a gas sensor, a liquid sensor, or other suitable electronic accessories (or data sources whether onboard or not onboard), whether having a mode of operation based on a line-of-sight technique or a non-line-of-sight technique. For example, a sensor (e.g., a microphone, a thermometer, a distance sensor, a proximity sensor, a motion sensor, a thermal sensor, a radar, a Lidar, a wind sensor, a rain sensor, a light sensor, a gas sensor, a liquid sensor) may be used to activate or deactivate the stereo pair 104 or augment or supplement the stereo pair 104 when sensing an object, as disclosed herein (although other suitable electronic accessories can also be used to activate or deactivate or augment or supplement the stereo pair 104 when sensing the object as disclosed herein). This may be useful in various scenarios (e.g., providing multiple different modalities of data capture, saving energy, reducing bandwidth). For example, the stereo pair 104 may be active 24/7 or active on-demand when woken up based on the sensor (and can fall asleep accordingly). For example, a suitable electronic accessory may be used to supplement or augment stereo imagery from the stereo pair 104. In case there is conflict between the suitable electronic accessory and the stereo pair 104, then there may be a default data source selected (e.g., the stereo pair 104 or the suitable electronic accessory) or there may be a set of rules for such conflict resolution or management.

The stereo pair 104 is stationary, but can be movable (e.g., rotating, panning, tilting). For example, each camera of the stereo pair can be stationary or movable, whether independent of each other or in-sync with each other or dependent on each other. For example, the stereo pair 104 can be embodied as an Intel RealSense depth unit (e.g., D415, D435, D455) or other suitable units. For example, the stereo pair 104 can be housing in a housing, which can be secured (e.g., fastened, mated, bracketed, hook-and-looped, adhered, magnetized) to a surface (e.g., a wall, a ceiling, a floor, a furniture item, a fixture, a pedestal, a platform). For example, the housing can include or be included in or be embodied as a light fixture (e.g., a chandelier, a recessed light fixture, a sconce), a light bulb, a ceiling fan (e.g., a core), a television set, a computer monitor, a furniture item (e.g., a chair, a table, a couch, a bed, a storage unit), an appliance (e.g. a dishwasher, a microwave, a refrigerator), a vending machine, an automated teller machine (ATM), a door, a gasoline pump, or other suitable fixtures, apparatuses, machines, or objects, whether for indoor or outdoor usage, whether weatherproof, sand-proof, waterproof, water-resistant, sand-resistant, water-repellant, sand-repellant, or not. For example, the stereo pair 104 can include a housing, as disclosed herein, including the pair of video cameras forming the stereo pair 104. For example, the housing can be secured (e.g., fastened, mated, adhered, magnetized) to a surface (e.g., a wall, a floor, a ceiling, an object) or the housing can be freestanding. For example, the stereo pair 104 and a suitable electronic accessory, as disclosed herein, can be included on or in a common housing (or commonly hosted by another form factor or positioned in other ways as disclosed herein). Note that, for example, the stereo pair 104 can be included in a group of cameras, which may collectively improve imaging quality, resolution, depth, or other imaging characteristics for uses, as disclosed herein, rather than the stereo pair 104 alone.

The processor 102 is in communication (e.g., wired, wireless, waveguide) with the stereo pair 104. For example, there may be a data cable, which can be detachable from at least one respective port, operably spanning between a computing form factor hosting the processor 102 and a stereo pair form factor hosting the stereo pair 104. As such, the processor 102 can receive the stereo imagery from the stereo pair 104, control the stereo pair 104 (e.g., move, zoom), receive diagnostics from the stereo pair 104, update software/firmware of the stereo pair 104, receive data from the electronic accessories of the stereo pair 104, control the electronic accessories of the stereo pair 104 (e.g., move, change modality), receive diagnostics from the electronic accessories of the stereo pair 104, update software/firmware of the electronic accessories of the stereo pair 104, or other functions with respect to the stereo pair 104 or the electronic accessories of the stereo pair 104.

The stereo pair 104 is real-time imaging the area 110, which can occur with calibration of the stereo pair 104 before such imaging or can occur without calibration of the stereo pair 104. In situations where there may be optical occlusions or blockages (e.g., garments, coats, bags, strollers, other objects), then multiple stereo pairs 104 may be used real-time image from different optical angles (or fields of view) to feed corresponding multiple stereo imageries to the processor 102, which may combine such imageries into a single imagery for processing, as disclosed herein. Regardless, the stereo pair 104 generates the stereo imagery (e.g., a pair of video feeds) in real-time. The stereo imagery depicts the area 110 containing the first object 106 and the second object 108. Note that the stereo imagery may be out-of-sync. For example, the pair of cameras may generate a pair of video feeds that may be out-of-synch with each other (e.g., on a frame-by-frame basis) due to positioning of the pair of cameras relative to each other (e.g., a pair of different optical axis or fields of view). The stereo pair 104 sends (e.g., feeds, pushes) the stereo imagery to the processor 102, whether serially or in parallel, such that the processor 102 can receive or access the stereo imagery. As such, the processor 102 can execute the set of executable instructions or the executable program (or other form of logic) stored in the memory, as explained above, and thereby perform various techniques of analysis of behavior of the first object 106 or the second object 108, whether individually or with respect to each other, as disclosed herein. For example, when the stereo pair 104 is local with the processor 102, then this configuration may provide various technical benefits of speed/bandwidth/responsiveness improvements, especially if the area 110 is busy with objects when the stereo pair 104 is imaging the area 110. Further, for example, in some situations, depending on use case, when the stereo pair 104 is installed or aligned to image the area 110, the stereo pair 104 may have an error or inaccuracy rate of about +/−0.5%, which may be sufficiently acceptable for various purposes, as disclosed herein. In some of those situations, if desired, such error or inaccuracy rate can be compensated for, which can be in real-time, or corrected, which can be in real-time, in various ways (e.g., repositioning of the stereo pair 104, reconfiguring or readjusting parameters of the stereo pair 104, employ compensatory or corrective algorithms).

Each of the processor 102 and the stereo pair 104 (including its electronic accessories) is powered via a respective mains electricity source or a common mains electricity source. However, this configuration can vary and at least one of the processor 102 or the stereo pair 104 (including its electronic accessories) can be powered via a battery (e.g., a lithium-ion battery), which may be rechargeable or replaceable. The battery may be charged via a renewable energy source (e.g., a photovoltaic cell, a wind turbine, a hydropower turbine). If the stereo pair 104 is included in a housing, then the housing may or may not contain or support the battery.

The first object 106 includes a static object or a dynamic object. The static object can include a fixture (e.g., a light fixture, a plumbing fixture), a stationary object (e.g., a furniture item, a fixture), an immobile object (e.g., a fixture, a stationary object), a freestanding object (e.g., a fixture, a stationary object), a vehicle (e.g., land, marine, aerial), an automobile, a truck, a trailer, a van, a railcar, an intermodal container, a package, a jewelry item, a piece of art, a medical device, a gasoline pump, a user interface (e.g., analog, digital, physical, virtual, touchscreen), a surface, or other suitable static objects. For example, the static object can include a hand sanitizing station, a door handle, a user interface, a child recreation item (e.g., a seesaw, a merry-go-round, a swing set, a slide, a jungle gym, a chin-up bar, a sandbox, a spring rider, a trapeze ring, a playhouses, a maze), a ladder, a gasoline pump, an ATM, a piece of art, a book, a store product, or other goods. For example, the hand sanitizing station can include (i) a faucet and a sink, (ii) a faucet, a source of soap (e.g., a bar of soap from a tray or a soap dish, a container of fluid soap either freestanding or secured to a wall, a fixture, or a furniture item), and a sink, (iii) a housing (e.g., freestanding or attached to a wall, a fixture, or a furniture item) containing a hand sanitizer (e.g., a hand sanitizing or antiseptic fluid) and a sink, (iv) a housing (e.g., freestanding or attached to a wall, a fixture, or a furniture item) secured to a wall and containing a hand sanitizer (e.g., a hand sanitizing or antiseptic fluid), or other suitable hand sanitizing stations. Note that other hand sanitizing activities can be tracked. For example, drying a hand with a towel, drying a hand with a powered dryer, putting a glove on a hand, removing a jewelry item (e.g., a ring, a bracelet, a watch) from a hand, or others. The dynamic object can include a person, an animal, a pet, a robot, a vehicle, an automobile, a truck, a trailer, a van, a railcar, an intermodal container, a package, a jewelry item, a piece of art, a medical device, a gasoline pump, a user interface (e.g., analog, digital, physical, virtual, touchscreen), a surface, or other suitable dynamic objects.

The second object 108 includes a static object or a dynamic object. The static object can include a fixture (e.g., a light fixture, a plumbing fixture), a stationary object (e.g., a furniture item, a fixture), an immobile object (e.g., a fixture, a stationary object), a freestanding object (e.g., a fixture, a stationary object), a vehicle (e.g., land, marine, aerial), an automobile, a truck, a trailer, a van, a railcar, an intermodal container, a package, a jewelry item, a piece of art, a medical device, a gasoline pump, a user interface (e.g., analog, digital, physical, virtual, touchscreen), a surface, or other suitable static objects. For example, the static object can include a hand sanitizing station, a door handle, a user interface, a child recreation item (e.g., a seesaw, a merry-go-round, a swing set, a slide, a jungle gym, a chin-up bar, a sandbox, a spring rider, a trapeze ring, a playhouses, a maze), a ladder, a gasoline pump, an ATM, a piece of art, a book, a store product, or other goods. For example, the hand sanitizing station can include (i) a faucet and a sink, (ii) a faucet, a source of soap (e.g., a bar of soap from a tray or a soap dish, a container of fluid soap either freestanding or secured to a wall, a fixture, or a furniture item), and a sink, (iii) a housing (e.g., freestanding or attached to a wall, a fixture, or a furniture item) containing a hand sanitizer (e.g., a hand sanitizing or antiseptic fluid) and a sink, (iv) a housing (e.g., freestanding or attached to a wall, a fixture, or a furniture item) secured to a wall and containing a hand sanitizer (e.g., a hand sanitizing or antiseptic fluid), or other suitable hand sanitizing stations. Note that other hand sanitizing activities can be tracked. For example, drying a hand with a towel, drying a hand with a powered dryer, putting a glove on a hand, removing a jewelry item (e.g., a ring, a bracelet, a watch) from a hand, or others. The dynamic object can include a person, an animal, a pet, a robot, a vehicle, an automobile, a truck, a trailer, a van, a railcar, an intermodal container, a package, a jewelry item, a piece of art, a medical device, a gasoline pump, a user interface (e.g., analog, digital, physical, virtual, touchscreen), a surface, or other suitable dynamic objects.

The area 110 can be indoors or outdoors. For example, the area 110 can include a defined area, which can include a room, a hallway, a warehouse, an elevator, a yard, a parking lot, an operating room, a clean room, a kitchen, a bathroom, a cubicle, a personal work area, a dining room, a bedroom, a public area, a library, a museum, a retail store, a police station, a hospital, or other suitable areas, whether indoors or outdoors, whether above ground, at ground level, or below ground. The area 110 contains the first object 106 and the second object 108. For example, the first object 106 can be a static object (e.g., a hand sanitizing station, a fixture, a furniture item, a door handle, a user interface, a parked vehicle, a freestanding industrial object, a medical device, a food handling device, a book, a piece of art) and the second object 108 can be a dynamic object (e.g., an adult, a child, a worker, a visitor, a medical professional, a food handling professional, a criminal, a maintenance technician, an animal, a pet, a robot). As such, the stereo pair 104 is imaging the area 110 in real-time and thereby generating the stereo imagery in real-time, where the stereo imagery depicts the area 110 containing the first object 106 and the second object 108. The stereo pair 104 feeds the stereo imagery to the processor 102 for the processor 102 to receive or access.

FIG. 2 illustrates an embodiment of a flowchart for the device for behavior analysis based on stereo imagery of FIG. 1 according to various principles of this disclosure. In particular, the processor 102 performs a process 200 includes a set of steps 202-212.

In step 202, there is accessing, via the processor 102, in real-time, of the stereo imagery of the area 110 including the first object 106 and the second object 108 engaging with the first object 106. However, note that this can be reversed (e.g., the second object 108 not engaging with the second object 106), which would enable various subsequent processing to be reversed accordingly. Further, note that there can be multiple of the first object 106 or the second object 108. As such, various subsequent processing can be modified, augmented, or supplemented accordingly.

Figure 3:
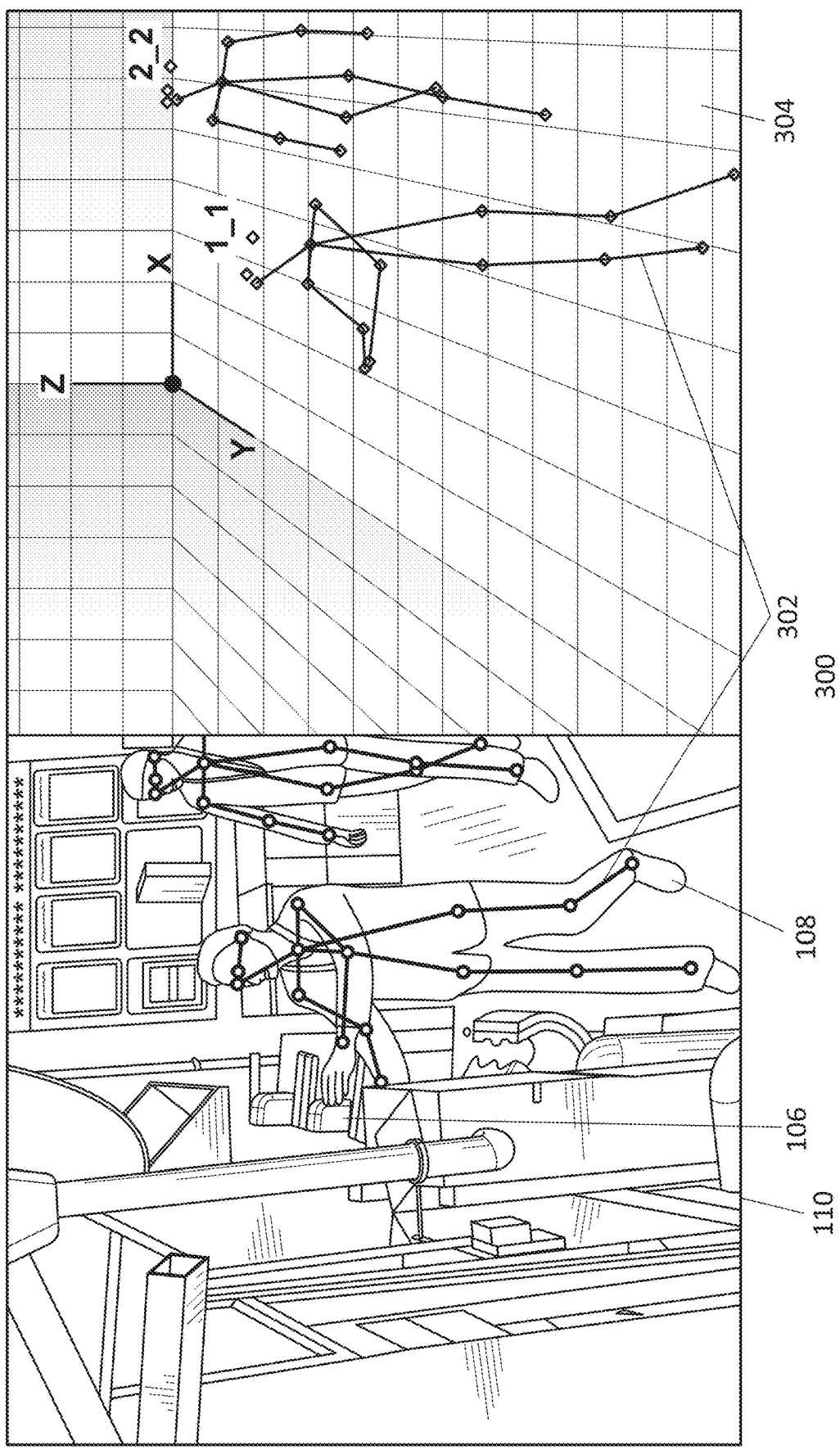
FIG. 3 illustrates an embodiment of a 3D skeletal model and a 3D area model of FIG. 1 according to various principles of this disclosure.

In step 204, there is forming, via the processor 102, in real-time, a reconstruction of the second object 108 in the area 110 based on the stereo imagery, as illustrated in FIG. 3. For example, the reconstruction can be formed as a set of corresponding computing actions, whether performed in series or in parallel, whether consecutively or with intermediate actions or events taking place. The reconstruction including a 3D area model and a 3D skeletal model within the 3D area model, as illustrated in FIG. 3. The 3D area model simulating the area 110, which can be based on the stereo imagery, as illustrated in FIG. 3. The 3D skeletal model simulating the second object 108 in the area 110 based on the stereo imagery (e.g., position, posture, movements, orientation), as illustrated in FIG. 3. For example, the processor 102 can detect the second object 108 (or the first object 106) within or based on the stereo imagery captured via the stereo pair 104. For example, the processor 102 can detect the second object 108 (or the first object 106) within or based on the stereo imagery captured via the stereo pair 104 via an artificial neural network (ANN) running on the processor 102 or accessible to the processor 102. For example, the ANN can include a convolutional neural network (CNN), a recurrent neural network (RNN), or other suitable networks. As such, the 3D skeletal model simulating the second object 108 in the area 110 can be based on the ANN detecting the second object 108 (or the first object 106) in the area 110, as imaged within or based on the stereo imagery captured via the stereo pair 104. As such, the reconstruction may capture a shape or at least a general appearance of the second object 108, whether by active or passive methods. For example, if the 3D area model or the 3D skeletal model is allowed to change its shape in time, then the reconstruction can include a non-rigid or spatio-temporal reconstruction.

The reconstruction may be based on a markerless motion capture technology (e.g., allows full-body 3D motion capture and analysis without any markers and based on silhouettes) or with markers (e.g., barcodes, optical tags, thermal tags) and can be formed in various ways. For example, as illustrated in FIG. 3, for the markerless motion capture technology, there may be silhouettes that are extracted (e.g., separation of person and background), fitting of silhouettes for virtual 3D-model and person (or object), and optimal fitting of silhouettes with 3D-model for allowing extraction of 3D joint positions and joint angles, which results in 3D joint positions and joint angles (similar to marker-based systems but without using markers). As such, the stereo imagery can be markerless motion capture (e.g., allows full-body 3D motion capture and analysis without any markers and based on silhouettes). Further, the processor 102 synchronize, in real-time, the pair of video feeds of the stereo imagery with each other (e.g. on a frame-by-frame basis), which may occur based on the processor 102 accounting how the pair of cameras of the stereo pair 104 is positioned relative to each other. Then, the processor 102 may input, in real-time, the pair of video feeds, as synchronized with each other, into a first ANN programmed to detect a pair of sets of image regions depicting the second object 108 (e.g., a person) positioned within the area 110 in the first video feed. For example, the first ANN can include a convolutional ANN, a recurrent ANN, or another suitable type. Then, the processor 102 may input, in real-time, the pair of sets of image regions into a second ANN programmed to form a pair of sets of 2D skeletal models simulating the second object 108 positioned within the area 110. For example, the second ANN can include a convolutional ANN, a recurrent ANN, or another suitable type, whether identical or non-identical in type to the first ANN. Then, the processor 102 may form, in real-time, the reconstruction of the second object 108 positioned within the area 110 based on the pair of sets of 2D skeletal models such that the 3D skeletal model simulating the second object 108 positioned within the area 110 is formed and the 3D skeletal model is virtually positioned within a virtual space simulating the area 110. For example, the 3D skeletal model can be real-time simulating the second object 108 positioned within the area 110, as illustrated in FIG. 3. For example, the virtual space can be real-time simulating the area 110. For example, the virtual space may have a coordinate system (e.g., X-Y-Z coordinate system) and may be formed from the stereo imagery sourced from the stereo pair 104 or before the stereo imagery is sourced from the stereo pair 104, as illustrated in FIG. 3. For example, the virtual space may be formed during a calibration process of the stereo pair 104. For example, the virtual space may contain an object model simulating the first object 106. For example, the object model may be formed from the stereo imagery sourced from the stereo pair 104 or before the stereo imagery is sourced from the stereo pair 104. For example, the object model may be formed during a calibration process of the stereo pair 104 or formation of the virtual space. For example, in some situations, depending on use case, the reconstruction (e.g., the 3D skeletal model, the 3D area model, the object model) may have an error or an inaccuracy rate of about +/−10%, which may be sufficiently acceptable for various purposes, as disclosed herein. In some of those situations, if desired, such error or inaccuracy rate can be compensated for, which can be in real-time, or corrected, which can be in real-time, in various ways (e.g., repositioning of the stereo pair 104, reconfiguring or readjusting parameters of the stereo pair 104, employ compensatory or corrective algorithms).

In step 206, there is identifying, via the processor 102, in real-time, a set of virtual movements of the 3D skeletal model in the 3D area model, where the set of virtual movements simulating the second object 108 engaging with the first object 106 in the area 110, as illustrated in FIG. 3. However, note that this can be reversed (e.g., the second object 108 not engaging with the second object 106), which would enable various subsequent processing to be reversed accordingly. Regardless, this identification may be performed in various ways. For example, when the second object (e.g., a person, a robot, an animal, a pet) has a real limb (e.g., an arm, a leg, a torso, a finger, a toe, an end effector), then the 3D skeletal model has a virtual limb real-time simulating the real limb, as illustrated in FIG. 3. As such, processor 102 may identify, in real-time, the set of virtual movements of the 3D skeletal model based on how the virtual limb moves (e.g., rotating, bending, tilting), whether individually or in combination with other virtual limbs or relative to the model object modeling the first object 106, as illustrated in FIG. 3. Likewise, the processor 102 may identify, in real-time, the set of virtual movements of the 3D skeletal model based on how the virtual limb is oriented (e.g., horizontally, vertically, diagonally), whether individually or in combination with other virtual limbs or relative to the model object modeling the first object 106, as illustrated in FIG. 3. Similarly, the processor 102 may identify, in real-time, the set of virtual movements of the 3D skeletal model based on how the virtual limb is bent (e.g., at a preset angle, higher or lower than a preset angle, within a range of angles), whether individually or in combination with other virtual limbs or relative to the model object modeling the first object 106, as illustrated in FIG. 3.

In step 208, there is identifying, via the processor 102, in real-time, a set of atomic movements of the 3D skeletal model corresponding to the set of virtual movements, as illustrated in FIG. 3. When the second object 108 (e.g., a person, an animal, an animal, a pet, a robot) includes a real limb (e.g., an arm, a leg, a torso, a finger, a toe, an end effector), then the 3D skeletal model can include a virtual limb simulating the real limb, the set of virtual movements can include a virtual movement of the virtual limb, and the set of atomic movements can include an atomic movement of the virtual limb. As such, the processor 102 may identify, in real-time, the set of atomic movements based on the atomic movement of the virtual limb corresponding the virtual movement of the virtual limb. The atomic movement of the virtual limb can include a bending of the virtual limb according to a preset rule (e.g., a preset angle, a first angle higher or lower than a second angle, within a range of angles). For example, an atomic movement of the set of atomic movements can be the second object 108 has person bent the virtual limb more than 90 degrees, as illustrated in FIG. 3.

When the second object 108 has a pose in the area 110 and the second object 108 includes a real limb in the area 110, then processor 102 may form, in real-time, the 3D skeletal model from the pose based on the stereo imagery and from how the real limb is positioned (e.g., oriented) in the area 110 based on the stereo imagery, as illustrated in FIG. 3. For example, the 3D skeletal model may incorporate positional and orientation information from the pose of the second object 108 or estimated pose (e.g., analytic algorithms, geometric algorithms, genetic algorithms, learning-based algorithms) of the second object 108, as illustrated in FIG. 3. As such, the processor 102 may identify, in real-time, the set of atomic movements based on the 3D skeletal model simulating the pose and how the limb is positioned in the area, as illustrated in FIG. 3.

In step 210, there is identifying, via the processor 102, in real-time, an event (e.g., a hand sanitizing event, a hand shaking event) defined by the set of atomic movements. For example, the event can be formed via a data organization (e.g., a data structure, a data record, a data object, a data entry, an instance of a class, a database record) informative of same. The event may further be defined by at least two sets of atomic movements that are different from each other in at least one atomic movement or a relationship between at least two atomic movements of a respective set of atomic movements. As such, the processor 102 may, in real-time, the event based on at least two sets of atomic movements.

Figure 4:
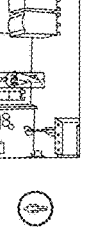
FIG. 4 illustrates an embodiment of a screenshot of a graphical user interface (GUI) enabling a user to operate a user input device, access a log of entries for an event being identified and not identified, and view an entry with a set of detailed information from the log of entries where the entry corresponds to an event not being identified (e.g., a non-identification of a hand sanitization of a person) according to various principles of this disclosure.

The event may be listed, hosted, stored, or otherwise included in a data organization to which the processor 102 has access, as illustrated in FIGS. 4 and 5. The data organization (e.g., a data structure, a table, an array, an ontology, a listing, a dictionary, a list, a mapping, a tree) may include a collection of events including the event that the processor 102 identifies or does not identify, as illustrated in FIGS. 4 and 5. The events may be listed as a collection of records, where each of the events may include an event identifier (e.g., an event name) and the set of atomic movements that define the event, as illustrated in FIGS. 4 and 5. For example, when the real limb is a real hand of the second object 108 and the first object 106 is a sanitizing station, then the second object 108 engaging with the first object 106 can include the second object 108 sanitizing the real hand at the sanitizing station and the event being a hand sanitizing event (the event identifier), as illustrated in FIGS. 4 and 5. For example, when the first object 106 is a first person having a first real hand and the second object 108 is a second person having a second real hand corresponding to the real limb, then the second object 108 engaging with the first object 106 can include the second real hand shaking the first real hand and the event is a hand shaking event (the event identifier), as illustrated in FIGS. 4 and 5. Note that the first object 106 can be imaged and simulated similarly as the second object 108. For example, when the first object 106 is a person, an animal, a pet, or a robot, then this simulation can occur via another 3D skeletal model simulating the first object 106 within the 3D area model.

In step 212, there is taking, via the processor 102, in real-time, an action responsive to the event being identified. For example, the action can include instructing an output device (e.g., an electronic display, an electrophoretic display, a touchscreen, a volumetric display, a speaker, a motor, an alarm, a bell, a siren), an input device (e.g., a touchscreen, a microphone, a camera), a sensor (e.g., a motion sensor, a proximity sensor, a distance sensor, a temperature sensor, a humidity sensor), a transmitter (e.g., wired, wireless, waveguide), a receiver (e.g., wired, wireless, waveguide), a transceiver (e.g., wired, wireless, waveguide), a modem (e.g., wired, wireless, waveguide), a network interface (e.g., wired, wireless, waveguide), or another suitable device to do or avoid doing an act (e.g., output a set of information, input a set of information, send a set of information, receive a set of information, present a prompt, activate an alarm, sound a siren, display a notice, avoid any of foregoing), whether related to or associated with or based on the event or not related to or not associated with or not based on the event, as illustrated in FIGS. 4 and 5. For example, the action can include memorialize the event in a memory (e.g., persistent storage), a log, a database, or other suitable storage mediums or data organizations, as illustrated in FIGS. 4 and 5, where the event (or other events) can be selectively retrievable, analyzable, or actionable. For example, memorializing the event may be useful in case disputes between employer and employee whether certain events occurred or not. Further, memorializing the event may motivate employees to comply with certain employment regulations. Also, memorializing the event allows for collection of data to evaluate effects of certain measures and behaviors on larger scale or longer periods of time.

When the second object 108 has a real face (e.g., a person, an animal, a pet, a robot) and the stereo imagery depicts the real face, the processor 102 may perform, in real-time, a recognition of the face based on the stereo imagery. Note that the recognition of the face can be based on a 2D image sourced from the stereo imagery captured via the stereo pair 104. As such, the action can be based on the recognition, as illustrated in FIGS. 4 and 5. For example, as illustrated in FIGS. 4 and 5, the action can include locating a personal identifier associated with the second object 108 (e.g., an employee number, a social security number, a first name and a last name, an email address, a phone number, a social network profile, a biometric, a fingerprint, a retina scan), retrieving a profile (e.g., a database record, a table row) associated with the personal identifier, populating (e.g., adding, modifying) a field in the profile with a set of data informative of the event being identified, and saving the profile with the field being populated with the set of data. When the processor 102 is unable to identify the event, then the processor 102 may take another action responsive to the event not being identified or identifiable, as illustrated in FIGS. 4 and 5. For example, this other action can also be based on the recognition. For example, this other action can include locating the personal identifier associated with the second object 108, retrieving the profile associated with the personal identifier, populating the field (or another field) in the profile with a set of data informative of the event not being identified, and saving the profile with the field being populated with the set of data, as illustrated in FIGS. 4 and 5. For example, if there is a list of profiles (or links to such profiles) associated with the event and a list of profiles not associated with the event, then the list of profiles associated with the event can be appended with the personal identifier responsive to the event being identified or the list of profiles not associated with the event can be appended with the personal identifier responsive to the event not being identified, as illustrated in FIGS. 4 and 5.

In order to track the event, the processor 102 may modify, in real-time, a log (or another form of data organization) for each occurrence of the event being identified and the event not being identified, as illustrated in FIGS. 4 and 5. For example, the log can be organized or organizable by, sorted or sortable by, or include each of the occurrences including an identifier associated with the second object 108, as illustrated in FIGS. 4 and 5. For example, the identifier can include an employee number, a social security number, a first name and a last name, an email address, a phone number, a social network profile, a biometric, a fingerprint, a retina scan, or another form of identification.

The processor 102 may retrieve a record (e.g., a database record, a table record) with a set of information for the event not being identified responsive to a request (e.g., a user input) from a user input device (e.g., a physical keyboard, a virtual keyboard, a touchscreen, a microphone, a camera, a cursor device), as illustrated in FIGS. 4 and 5. For example, if the second object 108 is a person who was not identified under a hand sanitizing event, then an operator may operate the user input device distal from the stereo pair 104 and access the set of information evidencing the person not hand sanitizing, as illustrated in FIGS. 4 and 5. For example, the set of information may include at least a user interface element (e.g., a button, a hyperlink) programmed to retrieve or play a portion of the stereo imagery (e.g., a screenshot, a video).

Figure 6:
FIG. 6 illustrates an embodiment of a screenshot of a GUI of FIG. 4 where a user operates a user input device to export at least some data for a time or date interval from a log of entries for an event being identified and not identified according to various principles of this disclosure.

If there is a desire to export information (e.g., as a portable document format (PDF) file, a delimited file, a comma-separated-values file, a spreadsheet, a text file, a flat file, a word processing document, a video file, a screenshot) evidencing the event being identified (e.g., the second object 108 performed hand sanitization) or the event not being identified (e.g., the second object 108 did not perform hand sanitization), as illustrated in FIGS. 4-6, then the processor 102 can access a log (or another form of data organization) containing a set of information for the event being identified (e.g., a hand sanitizing event being identified for the second object 108) and the event not being identified (e.g., a hand sanitizing event being identified for the second object 108) responsive to a request (e.g., a user input) from a user input device (e.g., a physical keyboard, a virtual keyboard, a touchscreen, a microphone, a camera, a cursor device), and export (e.g., save, email, upload) at least a subset of the set of information for a preset time period (e.g., a date range, a time range) responsive to the request from the user input device, as illustrated in FIGS. 4-6. For example, the log can be organized or organizable by, sorted or sortable by, or include each of occurrences of identification and non-identification of the event and including an identifier associated with the second object 108, as illustrated in FIGS. 4-6. For example, the identifier can include an employee number, a social security number, a first name and a last name, an email address, a phone number, a social network profile, a biometric, a fingerprint, a retina scan, or another form of identification, as illustrated in FIGS. 4 and 5.

Figure 7:
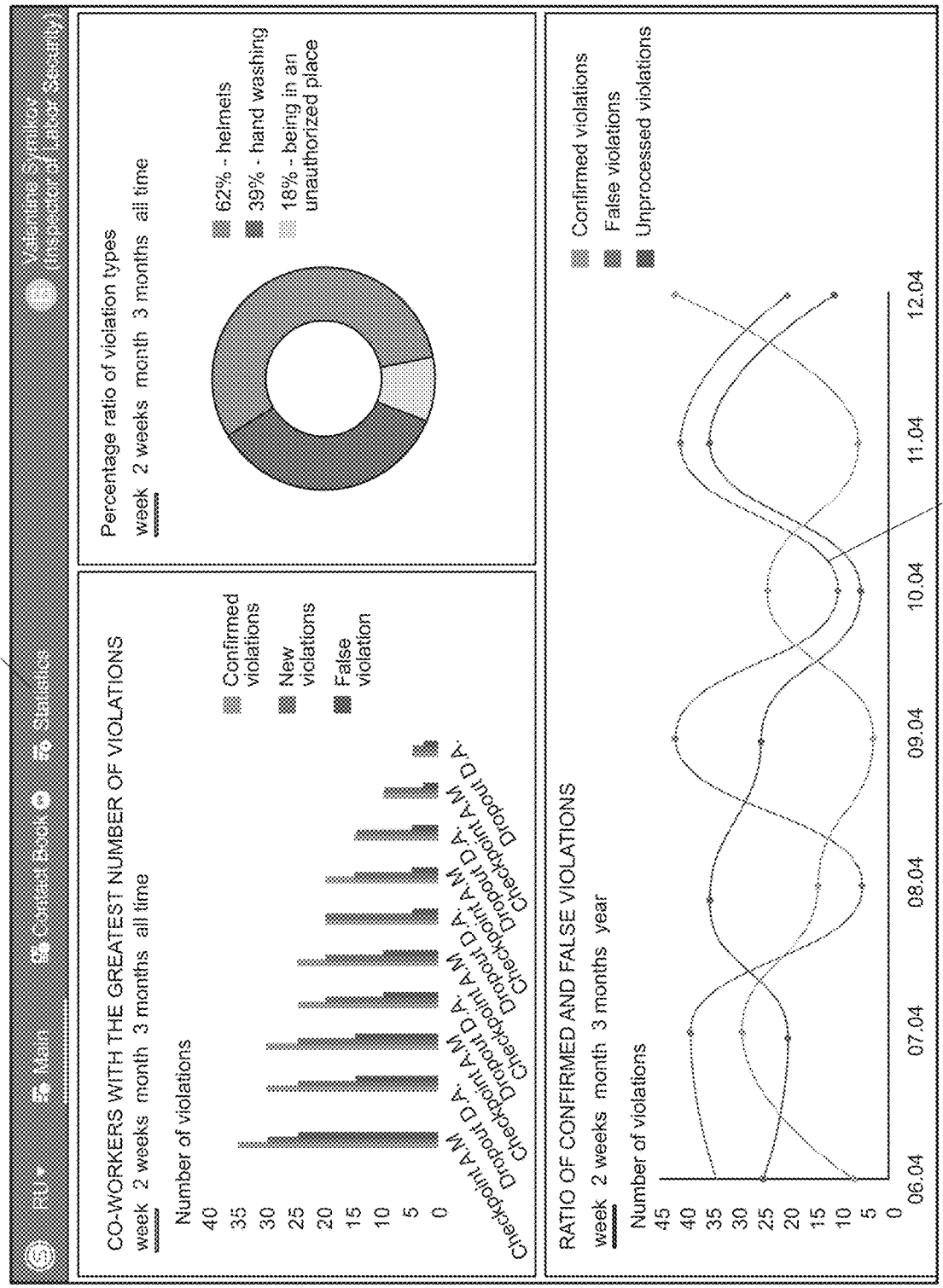
FIG. 7 illustrates a screenshot of a GUI showing a dashboard reporting various statistical data as a bar diagram, a circle diagram, and an X-Y diagram according to various principles of this disclosure.

If there is a desire to present an at-a-glance views of key performance indicators (KPIs) relevant to a particular objective or a business process or provide a progress report as a form of data visualization, then the processor 102 may generate a dashboard (e.g., a pie chart, a heat map, a bar diagram) based on a set of information for the event being identified and the event not being identified responsive a request (e.g., a user input) from a user input device (e.g., a physical keyboard, a virtual keyboard, a touchscreen, a microphone, a camera, a cursor device), as shown in FIG. 7. Then, the processor 102 may instruct an electronic display (e.g., a monitor, a touchscreen, an electrophoretic display, a volumetric display) to output the dashboard responsive to the request from a user input device.

When the event is not identified or identifiable, the processor 102 can responsively take another action. For example, this another action can include instructing an output device (e.g., an electronic display, an electrophoretic display, a touchscreen, a volumetric display, a speaker, a motor, an alarm, a bell, a siren), an input device (e.g., a touchscreen, a microphone, a camera), a sensor (e.g., a motion sensor, a proximity sensor, a distance sensor, a temperature sensor, a humidity sensor), a transmitter (e.g., wired, wireless, waveguide), a receiver (e.g., wired, wireless, waveguide), a transceiver (e.g., wired, wireless, waveguide), a modem (e.g., wired, wireless, waveguide), a network interface (e.g., wired, wireless, waveguide), or another suitable device to do or avoid doing an act (e.g., output a set of information, input a set of information, send a set of information, receive a set of information, present a prompt, activate an alarm, sound a siren, display a notice, avoid any of foregoing), whether related to or associated with or based on the event or not related to or not associated with or not based on the event, as illustrated in FIGS. 4 and 5. For example, this another action can include memorialize non-identification of the event in a memory (e.g., persistent storage), a log, a database, or other suitable storage mediums or data organizations, as illustrated in FIGS. 4 and 5. For example, when the processor 102 does not or is unable to identify the event, then the processor 102 may take this another action responsive to the event not being identified or identifiable, as illustrated in FIGS. 4 and 5. For example, this another action can also be based on a facial recognition of the second object 108, as illustrated in FIGS. 4 and 5. For example, this other action can include locating a personal identifier (e.g., an employee number, a social security number, a first name and a last name, an email address, a phone number, a social network profile, a biometric, a fingerprint, a retina scan) associated with the second object 108, retrieving a profile (e.g., a database record, a table record) associated with the personal identifier, populating a field in the profile with a set of data informative of the event not being identified or identifiable, and saving the profile with the field being populated with the set of data, as illustrated in FIGS. 4 and 5. For example, if there is a list of profiles associated with the event and a list of profile not associated with the event, then the list of profiles associated with the event can be appended with the personal identifier responsive to the event being identified or the list of profiles not associated with the event can be appended with the personal identifier responsive to the event not being identified, as illustrated in FIGS. 4 and 5. For example, the processor 102 may access an identifier (e.g., an employee number, a social security number, a first name and a last name, an email address, a phone number, a social network profile, a biometric, a fingerprint, a retina scan, a barcode, a RFID tag, an optical tag) for the second object and perform a first action involving the identifier responsive to the event being identified and a second action involving the identifier responsive to the event not being identified. For example, the second action may include requesting an output device (e.g., an electronic display, a speaker) to output an alert (e.g., audio, visual), an alarm (e.g., audio, visual), or a notice (e.g., audio, visual) indicative of the event not being identified or not identifiable or the event being identified or identifiable, as illustrated in FIGS. 4 and 5. Note the that output device can be remote from the stereo pair 104 or local to the stereo pair 104.

FIG. 3 illustrates an embodiment of a 3D skeletal model and a 3D area model of FIG. 1 according to various principles of this disclosure. In particular, there are two screenshots 300 presented side-by-side with each other (left and right). As depicted in a left screenshot, there is shown the area 110, the second object 108 (a person) within the area 110, and the first object 106 (a container with a hand sanitizer), where the second object 108 is engaging the first object 106 (hand sanitization). There is a 3D skeletal model 302 simulating the second object 108, as per FIG. 2. The 3D skeletal model 302 is illustrated as overlaying a region in a video from the stereo imagery of the stereo pair 106, where the region corresponds to detection by the processor 102 of the second object 108 depicted in the video. As depicted in a right screenshot, the 3D skeletal model 302 is illustrated within a 3D area model 304 simulating the area 110 in order to identify the set of virtual movements of the second object 108 within the 3D area model 304 for matching to the set of atomic movements, as per FIG. 2.

FIG. 4 illustrates an embodiment of a screenshot of a GUI enabling a user to operate a user input device, access a log of entries for an event being identified and not identified, and view an entry with a set of detailed information from the log of entries where the entry corresponds to an event not being identified (e.g., a non-identification of a hand sanitization of a person) according to various principles of this disclosure. In particular, a screenshot 400 depicts a GUI enabling a user to operate a user input device (e.g., a physical keyboard, a virtual keyboard, a touchscreen, a microphone, a camera, a cursor device), access a log of entries for the event being identified and not identified, as per FIG. 2, and view an entry with a set of detailed information from the log of entries where the entry corresponds to an event not being identified (e.g., a non-identification of a hand sanitization of a person), as per FIG. 2. The entry includes an identifier of the stereo pair 104, a date of the entry, a time of the entry, a description of the entry, an identifier of the second object 108, an e-signature text box, a button confirming or validating the event, a button confirming or validating a false entry, a thumbnail of a video from the stereo imagery capturing the event (or non-identified event) or its surrounding time, a play button overlaid of the thumbnail, and a download button overlaid over the thumbnail. For example, some of these parameters (or identifiers) can include a type of violation, a status of violation (e.g., new, confirmed, validated, false), a date of fixation of a violation, a time of fixation of a violation, a place of violation, a first and last name of a violator, a screenshot of a violation, a link to view a video depicting a violation, a link to download a video depicting a violation, or others.

The log of entries is shown in a dynamically expandable row when selected and a dynamically shrinkable row when closed or not selected. Note that the GUI also present a set of search fields above the log entries, where the set of search fields enables the user to operate the user input device and enter a set of search parameters into the set of search fields. The set of parameters can include a type of a violation (e.g., non-identification of the event), a status of violation (e.g., false or validated), an identifier of the second object 108, and a time or date period or range for searching the log of entries. Note that other relevant parameters (or identifiers) may be included, as disclosed herein. Likewise, note that this log of entries is not limited to people and can be used with other forms of the second object 108 (e.g., a pet, an animal, a robot) and correspondingly suitable entries, parameters, and other content would apply.

FIG. 5 illustrates a screenshot of a GUI of an object directory (e.g., a staff directory) where each second object is listed on a row basis and has an identifier of each respective second object, a contact information of each respective second object, a department of each respective second object, and a count of events (e.g., an identification of an event, a non-identification of an event) of each respective second object according to principles of this disclosure. In particular, a screenshot 500 includes a staff directory where each detected violation (e.g., identification of shaking hands, non-identification of hand washing) of can be associated to a violator (e.g., person). For example, a top most row lists a person's name, a phone number, a corporate division, a total number of events (e.g., identification of shaking hands, non-identification of hand washing) associated this the person's name. Note that this staff directory is not limited to people and can be used with other forms of the second object 108 (e.g., a pet, an animal, a robot) and correspondingly suitable content would apply.

FIG. 6 illustrates an embodiment of a screenshot of a GUI of FIG. 4 where a user operates a user input device to export at least some data for a time or date interval from a log of entries for an event being identified and not identified according to various principles of this disclosure. In particular, a screenshot 600 shows a window presented over a log of entries for an event being identified and not identified. The window includes a first row with a set of user input elements for selection of a beginning of a time or date interval and a second row with a set of user input elements for selection of an end of the time or date interval. The window also has a cancel button to close the window and a select button to retrieve or locate at least some data as selected from the first row and the second row. As such, the user is enabled for report viewing or export with an ability to choose a reporting period. For example, at least some of this data can include images, thumbnails, videos, or electronic accessory data from the stereo pair 104. As such, the user can access a subset of the log of entries based on such filtering of the log of entries.

FIG. 7 illustrates a screenshot of a GUI showing a dashboard reporting various statistical data as a bar diagram, a circle diagram, and an X-Y diagram according to various principles of this disclosure. In particular, a screenshot 700 includes a screen of a GUI having a menu 702 and a visualization portion 704. The menu 702 include a tab for statistics, a tab for violations (e.g., identification of events, non-identification of events) with a current count of violations, and a tab for a dictionary, as disclosed herein. On selection, each tab presents a respective window with corresponding content. As illustrated in FIG. 7, the tab for statistics is currently selected thereby showing a window with the visualization portion 704.

The visualization portion 704 includes a pane with a bar diagram with a Y-axis corresponding to a count of violations (e.g., identification of events, non-identification of events) and an X-axis corresponding an identifier (e.g., a name, an employee number) of the second object 108. Each of the identifiers has a set of bars of different colors corresponding to a validated (e.g., red) violation (e.g., identification of events, non-identification of events), a new violation (e.g., blue) violation (e.g., identification of events, non-identification of events), and a false (e.g., black) violation (e.g., identification of events, non-identification of events).

The visualization portion 704 includes a circle diagram with a set of tabs corresponding to a set of time periods (e.g., weeks, months, all captured time) where a leftmost tab (one week) is currently selected. The circle diagram is segmented by color where one color (e.g., red) represents violations (e.g., identification of events, non-identification of events) for presence of a helmet, another color (e.g., blue) represents violations (e.g., identification of events, non-identification of events) for hand sanitizing, and another color (e.g., grey) represents violations (e.g., identification of events, non-identification of events) for presence in inappropriate place.

The visualization portion 704 includes an X-Y diagram with a Y-axis corresponding to a count of violations (e.g., identification of events, non-identification of events) and an X-axis corresponding to a time of day when violation occurred (e.g., identification of events, non-identification of events). The X-Y diagram includes a first plot (e.g., a red or different color solid line), a second plot (e.g., a blue or different color solid line) and a third plot (e.g., a black or different color solid line). The first plot corresponds to confirmed or validation violations (e.g., identification of events, non-identification of events). The second plot corresponds to false violations (e.g., identification of events, non-identification of events). The third plot corresponds to unprocessed violations (e.g., identification of events, non-identification of events).

Figure 8:
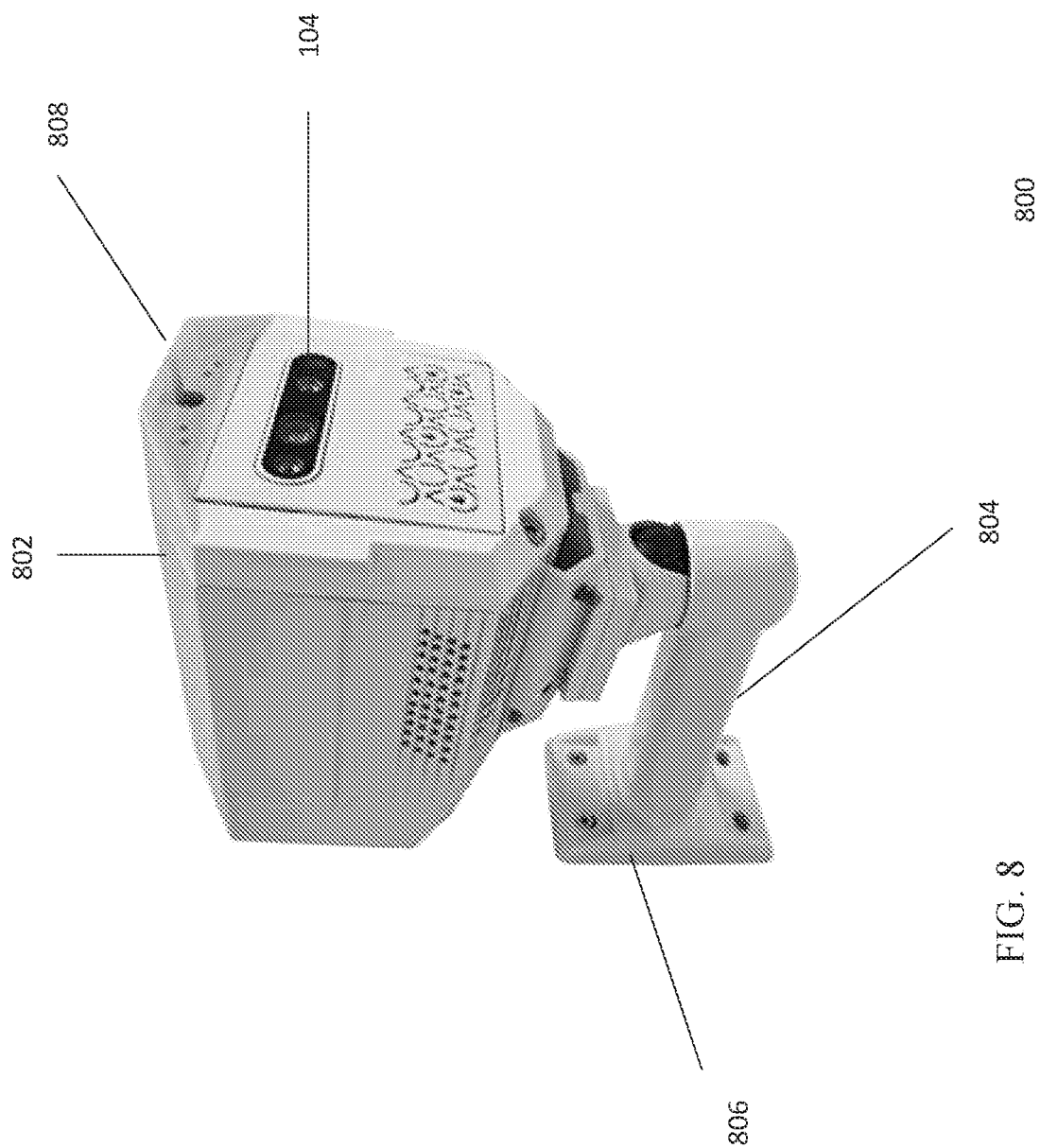
FIG. 8 illustrates an embodiment of a unit hosting a stereo pair of FIG. 1 according to various principles of this disclosure.

FIG. 8 illustrates an embodiment of a unit hosting a stereo pair of FIG. 1 according to various principles of this disclosure. In particular, a unit 800 includes the stereo pair 104, a housing 802, an arm 804, and a bracket 806. Although the unit 800 does not include the processor 102, in some situations, the unit 800 can include the processor 102 (e.g., within the housing 802, the arm 804, the bracket 806).

The housing 802 (e.g., metal, plastic) hosts (e.g., houses) the stereo pair 104 such that the stereo pair 104 can real-time image the area 110 with the first object 106 and the second object 108, as per FIGS. 1-3. The housing 800 includes a brim 808 (e.g., metal, plastic) cantileveredly extending therefrom in order to enhance quality of real-time imaging of the stereo pair 104 (e.g., shield from sun, rain, overhead lighting). Note that the brim 808 can be absent.

The arm 804 is rectilinear, but can be non-rectilinear (e.g., arcuate, sinusoidal, helical). The arm 804 is non-articulating, but can be articulating.

The arm 804 (e.g., metal, plastic) has a distal end portion and a proximal end portion. The distal end portion of the arm 804 hosts the housing 802. For example, the housing 802 can be secured, mounted, magnetized, fastened, mated, interlocked, or otherwise coupled to the distal end portion of the arm 804. The housing 802 is positioned fixed relative to the distal end portion of the arm 804, but can be positioned movable (e.g., rotate, tilt, pitch, yaw, roll) relative to the distal end portion of the arm 804. The proximal end of the arm 804 includes the bracket 806 for securing onto or through a surface (e.g., a horizontal surface, a vertical surface, a diagonal surface, a wall, a ceiling, a floor, a furniture item, a fixture). The arm 804 and the bracket 806 is a monolithic piece (e.g., molded, 3D printed), but can be assembled with each other (e.g., fastening, mating). The arm 804 is positioned fixed relative to the bracket 806, but can be positioned movable (e.g., rotate, tilt, pitch, yaw, roll) relative to the bracket 806.

In one mode of operation, as per FIGS. 1-8, the device 100 can be used to analyze behavior of a person on a video, which can be augmented or supplemented with data from a suitable electronic accessory, as described above. The device 100 can be employed within an industrial or office setting (e.g., a factory, an assembly line, an office work environment, a cubicle work environment) in order to identify a presence of or an absence of various personal behaviors (e.g., identification of events, non-identification of events). For example, some of these behaviors include hand sanitizing (e.g., using soap and water, using a hand sanitizing solution) or not within the area 110, holding a mobile or cordless phone or not within the area 100, smoking or not in a non-smoke area 110, climb on or climb off or not a forbidden structure (e.g., a cistern, a traffic light, a street sign, a tree) within the area 110, holding onto a handrail or not within the area 110, or other industrial or office use cases in the area 110. The device 100 can be employed in a retail setting (e.g., a store, a supermarket, a pharmacy, a toy store) in order to identify a presence of or an absence of various personal behaviors (e.g., identification of events, non-identification of events). For example, some of these behaviors include distributing leaflets or marketing materials within the area 110 or not, placing or organizing retail goods on shelves within the area 110 or not, or other retail settings. The device 100 can be employed in a situational awareness or tactical analytic setting (e.g., a train station, a bus station, an airport, a bank, a parking lot, a bar, a restaurant, a zoo, a circus, an hotel, a store, a stadium, a concert hall, an outdoor park) in order to identify a presence of or an absence of various personal behaviors (e.g., identification of events, non-identification of events). For example, some of these behaviors include running within the area 110 or not, falling within the area 110 or not, fighting within the area 110 or not, sitting within the area 110 or not, or other situational awareness or tactical analytic settings.

There are various ways to implement this mode of operation. For example, one way to implement this mode of operation is via the processor 102 when the stereo pair 104 is embodied as a depth camera and a video camera synchronized with the depth camera. For example, another way to implement this mode of operation is via the processor 102 when the stereo pair 104 is a pair of IP cameras. Note that these ways can be mixed and matched, if desired. Likewise, the stereo pair 104 can be supplemented or augmented by data from a suitable electronic accessory, as described above.

When the stereo pair 104 is embodied as a depth camera and a video camera synchronized with the depth camera, there is also the processor 102 (e.g., a server), and the housing 802 hosting the processor 102 and the stereo pair 104, as per FIG. 8 or other form factors as described above (e.g., a branch of a frame). The depth camera may collocated with the video camera and be embodied as a single unit, such as an Intel RealSense depth unit (e.g., D415, D435, D455) or other suitable units. Programmatically (e.g., executable via the processor 102), there is also a video management system (VMS), a video analytical logical unit (e.g., a module, a function, an object, a pausible engine), and an event processing logical unit (e.g., a module, a function, an object, a pausible engine). The video analytical logical unit includes an algorithm logical unit (e.g., a module, a function, an object, a pausible engine) that is based on or includes an ANN (e.g., a CNN, a RNN) to skeletize objects (e.g., a person), an expert system (e.g., a semantic expert system, a semantic analyzer), and a calibration logic unit (e.g., a module, a function, an object, a pausible engine). For example, when such units are embodied as modules, then this distribution provides a distributed architecture, which may be useful for redundancy, resiliency, security, or other technical benefits.

The VMS can be programmed to provide collection, display, processing, systematization, storage, and control of video and audio data, data from subsystems of video-analytics and integrated systems, and also related information. For example, for the stereo imagery captured via the stereo pair 104, the VMS may provide collection, display, processing, systematization, storage, and control of video and audio data, data from subsystems of video-analytics and integrated systems, and also related information. For example, the processor 102 can run the VMS. For example, the VMS can be embodied as an ISS SecurOS platform or other suitable VMS systems.

The video analytical logical unit is natively integrated with the VMS, which enables receipt of video data from the stereo pair 104, receipt or formation of a depth map (e.g., an image or image channel that contains information relating to a distance of a set of surfaces of a set of scene objects from a viewpoint) from or based on the video data from the stereo pair 104, and metadata from the stereo pair 104 for subsequent processing within the VMS (e.g., via the processor 102).

The algorithm logical unit that is based on or includes the ANN to virtually skeletize objects (e.g., executable via the processor 102) may have the ANN programmed to receive an input and an output. The input may include the depth map or other suitable data (e.g., images, parameters). The output may include a set of key points of a virtual skeleton (e.g., the 3D skeletal model 302) of an object (e.g., a person, an animal, a pet, a robot) imaged in the stereo imagery captured via the stereo pair 104, where the set of key points and the virtual skeleton simulate the object in real-time, whether the first object 106 or the second object 108. For example, if there are multiple people imaged (e.g., in a frame or on a per-frame basis) in the stereo imagery captured via the stereo pair 104, then the output may include multiple virtual skeletons simulating the multiple people in real-time. For example, the set of key points may include a head, a shoulder, an elbow, an arm, a leg, a wrist, a spine, or other limbs or features of a person (or another object type as explained above) imaged in the stereo imagery captured via the stereo pair 104. The output includes the set of key points of the virtual skeleton with a set of 3D coordinates therefor. For example, the set of 3D coordinates may be included in a set of metadata or other suitable data form.

The expert system (e.g., executable via the processor 102) can include a computer system emulating a decision-making ability of a human expert by reasoning through a body of knowledge, represented mainly as if-then rules rather than through a conventional procedural code. The expert system can include two subsystems: an inference engine (e.g., a pausible software logic programmed to make a set inferences) and a knowledge base (e.g., a database storing a set of facts as a ground truth). For example, the knowledge base can represent a set of facts and a set of rules. The inference engine, whether forward chaining or backward chaining, applies the set of rules to the set of facts in order to deduce a set of new facts. The inference engine can include an automated reasoning system that evaluates a current state of the knowledge base, applies a set of relevant rules from the set of rules stored in the knowledge base, and then asserts new knowledge (e.g., an inference) into the knowledge base. The inference engine may also include abilities for explanation, so that the inference engine can explain to a user a chain of reasoning used to arrive at a particular conclusion by tracing back over an execution of rules that resulted in the particular conclusion. The inference engine can be programmed for truth maintenance (e.g., record a set of dependencies in the knowledge base so that if some facts are altered, then dependent knowledge can be altered accordingly), hypothetical reasoning (e.g., the knowledge base can be divided up into many possible views, a.k.a. worlds, in order to allow the inference engine to explore multiple possibilities in parallel), uncertainty systems (e.g., associate a probability with each rule, fuzzy logic usage), ontology classification (e.g., reasoning about object structures, classifiers), or other suitable functionalities. For example, the expert system can be interpretative, predictive, monitoring, instructive, controlling, or of other suitable categories.

When the expert system is embodied as a semantic analyzer (e.g., a software logic programmed to enforce static semantic rules or construct a syntax tree), then the semantic analyzer establishes an unambiguous or one-to-one correspondence or relationship or dependence between a set of natural-language constructs, and mathematical and logical operators, and functions that indicate exactly how to process a set of original numerical or digital data for interpreting what is happening in a scene (e.g., the area 110) imaged in the stereo imagery captured via the stereo pair 104. In addition, a finiteness of a list of basic meanings (e.g., the set of atomic movements) allows a creation of an array (or a table, a data structure, or another form of data organization) of mathematical and logical functions that can be used, and due to this will become a the knowledge base that ensures a unification of representations (e.g., the set of atomic movements) as preset (e.g., created, updated, modified, copied) by an operator or a user of the device 100.

The semantic analyzer in its work can rely on an ontology or a quasi-ontology. The ontology or the quasi-ontology can be embodied as or be included in or include a file (e.g., an extensible markup language (XML) file, a JavaScript object notation (JSON) file, a flat file, a text file, a delimited file, an array, a tree, a data structure or another data representation) that lists objects (static or dynamic), contains a markup of a scene by a set of control zones in which objects (e.g., the first object 106, the second object 108) can be detected, as well as various predicates that represent the unity of syntactic-semantic templates, as preset by the operator or the user of the device 100. For example, the predicates can be various models of natural language sentences that correspond to various basic meanings of verbs or other parts of speech that reflect an essence of an action/state. For example, a predicate "bend" can include, mean, infer, represent, or imply that a person (or another object) can bend an arm, a forearm, an elbow, a leg, or another limb or feature and its mathematical-logical representation. For the predicate "bend", if the person has the arm or the leg, then there may be an angle or an orientation or a positioning or a pose between the shoulder and the forearm. As such, since a number of atomic (or basic or elementary) meanings is finite, then the processor 102 is enables to create a "dictionary" that corresponds thereto.

The calibration logic unit enables the user or the operator of the device 100 to select, input, or create special gestures (e.g., hand gestures) to specify an origin and a set of reference points for inputting into or reading by the semantic analyzer to work, as described above. The processor 102 then link the origin and the set of reference points to the 3D area model 304.

The event processing logical unit is programmed to allow for audit and statistical processing of events or non-identification of events, output of results on a state of labor safety (or non-labor safety or non-safety or other events) at specific control areas.

Figure 9:
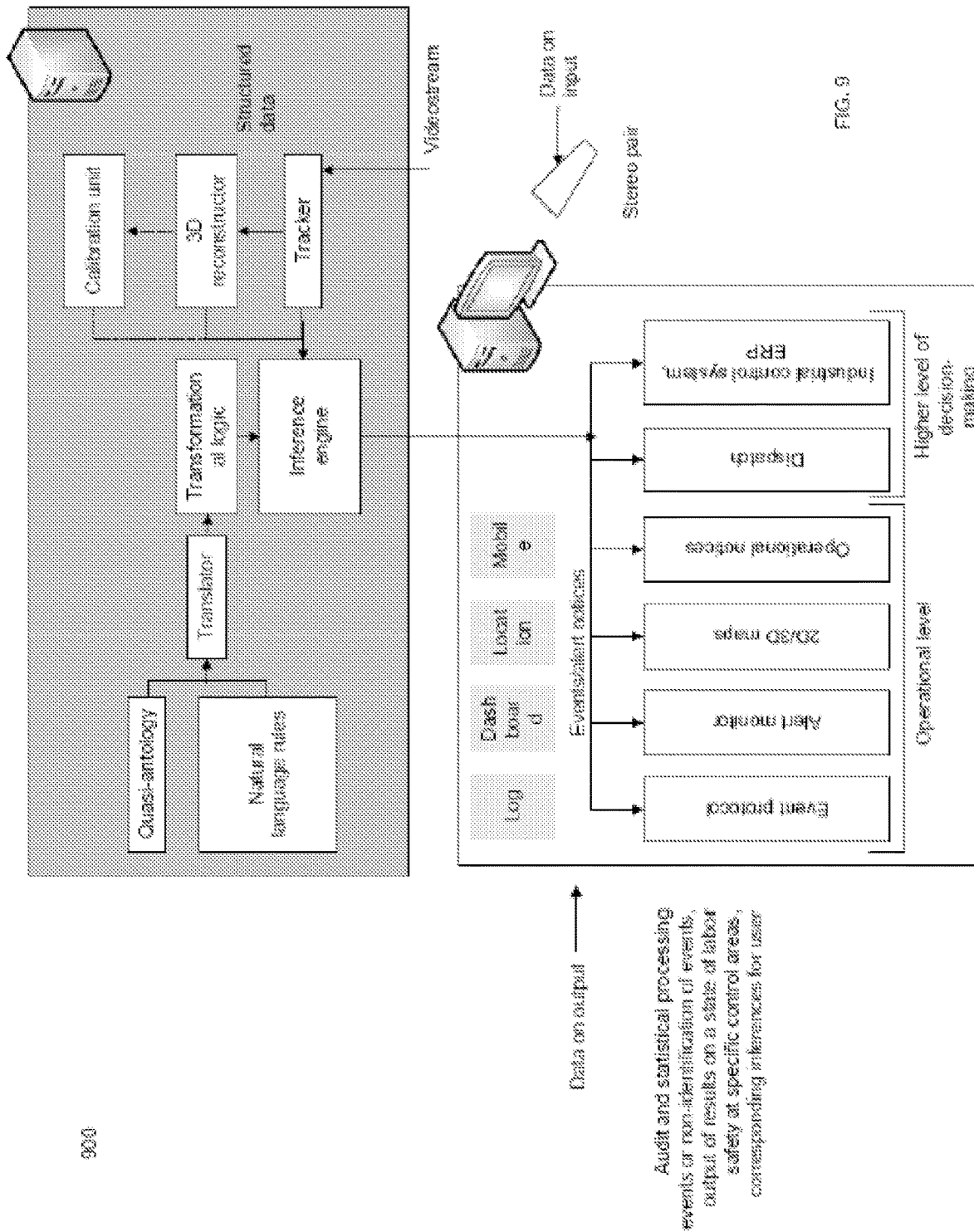
FIG. 9 illustrates an embodiment of a functional block diagram where the device of FIG. 1 has a stereo pair embodied as FIG. 8 according to various principles of this disclosure.

FIG. 9 illustrates an embodiment of a functional block diagram where the device of FIG. 1 has a stereo pair embodied as FIG. 8 according to various principles of this disclosure. In particular, a functional block diagram 900 includes the stereo pair 104, a first block (blue background), and a second block (white background). The first block corresponds to a logic (a) receiving the stereo imagery from the stereo pair 104, as per FIGS. 1-8, (b) processing the stereo imagery to perform the reconstruction, as per FIGS. 1-8, and (c) the expert system determining whether the event is identified or not identified, as per FIGS. 1-8. For example, the first block can be or include a VMS. The second block corresponds to a logic for decision making based on what the expert system outputs, as per FIGS. 1-8. Note that the first block or the second block can include or be executable via the processor 102.

As illustrated in FIG. 9, for the first block, which can be performed via or caused to be performed via the processor 102, the stereo pair 104 feeds a pair of data streams that are synchronized to the first block (e.g., a VMS), which can be supplemented or augmented by data from a suitable electronic accessory, as described above. The pair of streams includes a red-green-blue (RGB) video and a set of metadata (e.g., a depth map) from the stereo pair 104 (e.g., from each camera) preprocessed on the stereo pair 104 (e.g., on each camera). The RGB video can be used for display, in real-time, and recordation thereof in an archive (e.g., a memory, a database) in order to potentially analyze various incidents depicted therein. The set of metadata (e.g., a depth map) can be input into an ANN, which can detect the second object 108 (or the first object 106) in an analyzed scene space in the RGB video, track the second object 108 (or the first object 106) in the RGB video, and virtually skeletize (e.g., form a 3D skeletal model) the second object 108 (or the first object 106) from the from the RGB video, as disclosed herein. This way, for each RGB frame of the RGB video, there may be available a set of modeling metadata (e.g., a set of key points or joints of a 3D skeletal model). The set of modeling metadata can be used for scene calibration or direct analysis.

As illustrated in FIG. 9, for the second block, which can be performed via or caused to be performed via the processor 102, there is an expert system, as disclosed herein. The expert system includes a quasi-ontology that lists various object (static and dynamic), containing a markup of a scene by a set of control zones in which these objects can be detected (as disclosed herein), and various predicates representative of a unity of syntactic-semantic templates. For example, the quasi-ontology can be embodied as or include or be included in a file (e.g., an XML file, a JSON file, a flat file, a text file, a delimited file, an array, a tree, a data structure or another data representation). These predicates can be models of natural language sentences that correspond to various basic meanings of verbs or other parts of speech that reflect an essence of an action or a state. For example, for a predicate "bend," a person (or the first object 106 or the second object 108) can bend a limb (e.g., a head, a neck, a torso, an arm, a leg, a finger, a toe, an end effector) and its mathematical-logical representation. For the predicate "bend", if the limb is a hand, then need there may be a virtual angle between a virtual shoulder and a virtual forearm of the person (or the first object 106 or the second object 108). Since a number of basic (e.g., atomic or elemental) meanings is finite, then there may be a corresponding dictionary created.

The unity of syntactic-semantic templates can include a set of natural language rules (e.g., manually input by an operator via a physical or virtual keyboard who is presented a GUI having a text box programmed for a text entry, automatically received from a data source, updated via an update from a remote data source) forming the knowledge base of the expert system. For example, if there is a desire to monitor a certain area A (e.g., the area 110) and activate an alarm (e.g., via a speaker or a display or a message sent to a mobile phone or another mobile device) when a person (or another object) is within the certain area A for a preset time period (e.g., about 5 seconds, about 2 minutes) or more, then a natural language rule can be written in various ways. For example, one of such ways can include a conditional "IF a person is in zone "A" for {more than 5 seconds}, THEN activate an alarm." Note that these natural language rules can also be written based data received from a suitable electronic accessory, as described above, in order to validate, confirm, supplement, augment, or otherwise assist the processor 102 to process or act on more than just the stereo imagery.

Note that there may be a large number of such conditions or conditionals, any of which can be nested or Boolean, as needed via using a GUI programmed to receive natural text, which can be edited therein (although can also be received from another data source). Likewise, there may be various basic (or atomic or elemental) meanings being compounded or forming new more complex meanings in an action section after "THEN", which can act as conditions or conditionals for a set rules of a next level (e.g., a sequence or cascade of events or actions). In this part, there may be recited a description of various deviations from normal or expected behavior or actions of objects or with respect to objects based on various regulations (e.g., legal, business, or situational use cases). There may be a translator logic programmed to translate, based on the quasi-ontology, the natural language, as input or saved, into various suitable structures, instructions, or content, which can be readable and understandable to the inference engine. Resultantly, the translator logic feeds its translations into a transformational logic that can be programmed to output a set of transformational content (e.g., structures, instructions, content, executable code) formed based on the translations from the translator logic. The set of transformational content can be readable and understandable to the inference engine. The inference engine can include a dynamic library written in a programming language that makes an inference or a conclusion about whether a certain behavior occurs or is detected or not. The transformational logic inputs or feeds the set of transformational content, along with real-time metadata, which can include or be sourced from or be based on the set of metadata, the set of modeling metadata, or other metadata, as disclosed herein. Based on such input, the inference engine processing such data and decides whether a particular behavior occurs or is detected. This decision is input or fed into the second block. The second block enables processing of events, as disclosed in context of FIGS. 3-7. For example, various results (events/incidents) received from a video analysis module can be processed by the second block.

Figure 10:
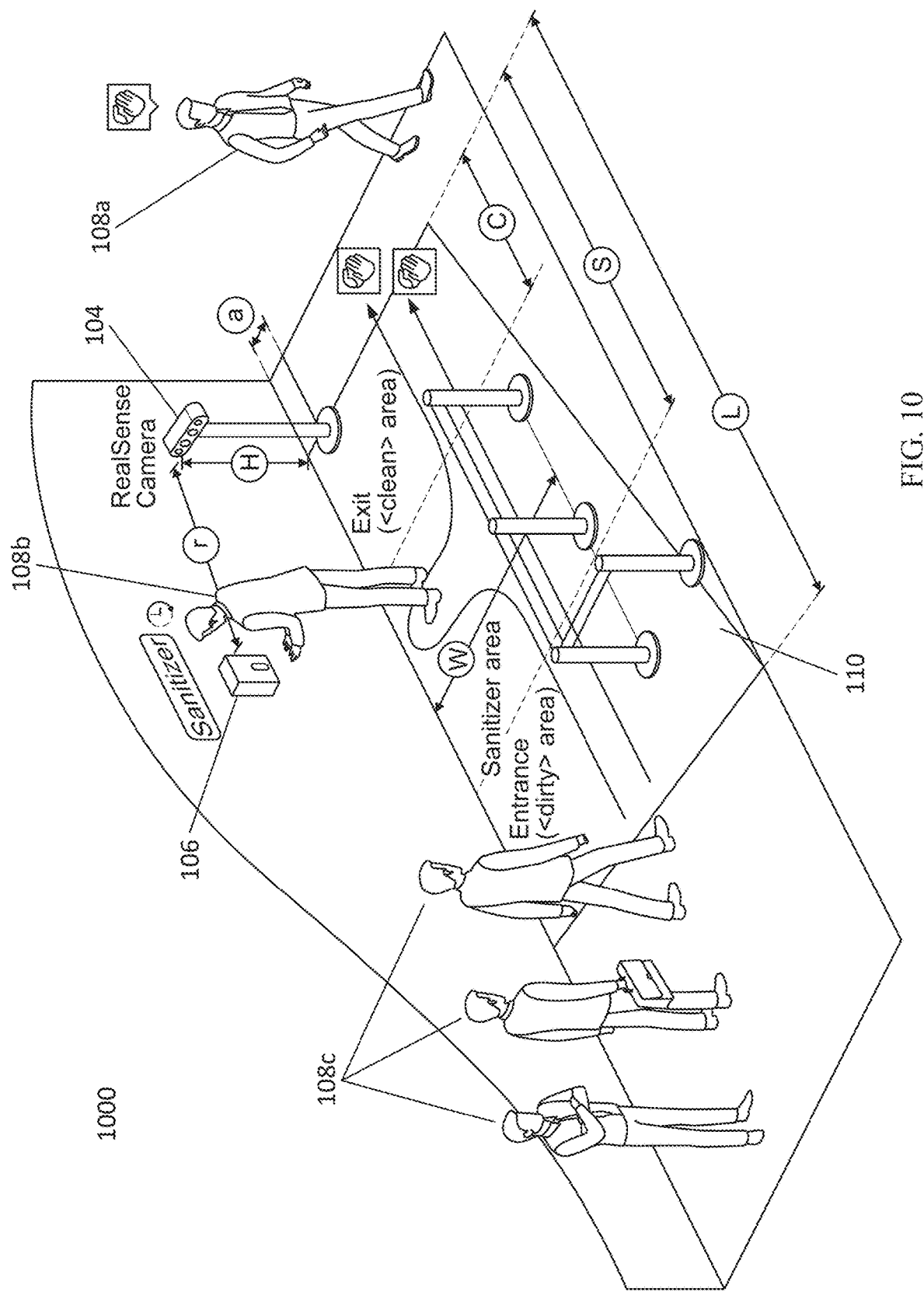
FIG. 10 illustrates an embodiment of a mode of operation of the device of FIG. 1 according to various principles of this disclosure.

FIG. 10 illustrates an embodiment of a mode of operation of the device of FIG. 1 according to various principles of this disclosure. In particular, a mode of operation 1000 includes the area 110 which is real-time imaged by the stereo pair 104 in order to create the stereo imagery to be fed to the processor 102. In this scenario, the first object 106 is a static object embodied as a fixture embodied as a dispenser of a fluid for hand sanitization (e.g., an antiseptic liquid or gel). There are five of the second objects 108 shown as five dynamic objects embodied as five people. The second object 108a has left the area 110, the second object 108b is within the area 110, and the second objects 108c are about to enter the area 110 and are standing in line (e.g., a straight line, a bent line, an arcuate line). The processor 102 is programmed to determine whether some, many, most, or all of the second objects 108 have used the first object 106 prior to entry into another area past the area 110.

When preparing the scene, the following linear illustrative and example dimensions (in meters) are observed:

W—a width of a control zone. Maximum value is 2 meters;

L—a length of a control zone. Maximum value is 4 meters;

H—a camera mounting height. Range of values (in meters): [1,3-1,5];

a—a distance from a plane of a sanitizer housing to a camera. Range of values: [0,3-0,4];

c—a distance from a camera to an exit area. Maximum value is 1 meters;

s—a distance from a camera to an entrance area. Maximum value is 3 meters;

r—a distance from a camera to a sanitizer housing. Range of values (in meters): [1,5-2,0].

Actual scene parameters (c, s) are specified in an Action-Tracker RS object settings. For example, as shown in FIG. 10, the expert system has a rule loaded for a passage of a person (or another object disclosed herein) through the area 110. The rule can be (a) the person appears in an entrance zone (e.g., a dirty zone) of the area 110, (b) the person moves from the entrance zone to a control zone (e.g., a sanitization zone) of the area 110, which contains the dispenser of the fluid for hand sanitization, (c) the stereo pair 104 images the control area while the person is positioned in the control area in order for the processor 102 to determine whether the person utilized the dispenser of the fluid for hand sanitization for self-hand (or other) sanitization purposes, (d) the person moves from the control zone to an exit zone (e.g., a clean zone) of the area 110 after utilizing the dispenser of the fluid for hand sanitization for self-hand (or other) sanitization purposes, and (e) the processor 102 acts (e.g., instructs an output device to output an output) based on determining whether the person utilized the dispenser of the fluid for hand sanitization for self-hand (or other) sanitization purposes. Since the area 110 may have its zones (as explained above) differ based on context (e.g., a restaurant, a café, a corridor, a yard, a parking lot, a hospital), the processor 102 has an option to change parameters (e.g., dimensions, sizes, areas, volumes) of those zones in order to be customizable for such contexts. Therefore, the ActionTrackerRS object setting enable such functionality, which can be applied to various scenarios or use cases, as disclosed herein. Moreover, note that these dimensions are illustrative and examples and therefore can vary, whether independent or dependent on each other, whether higher, lower, remain same, as needed for a specific use case.

The area 110 is segmented into an entrance area (e.g., a dirty zone), an event identification area (e.g., a sanitizing zone), and an exit area (e.g., a clean zone), where the event identification area is positioned (e.g., extends, interposed) between the entrance area and the exit area. Therefore, the second objects 108 walk, one at a time, from the entrance area to the event identification area, towards the stereo pair 104 while being real-time imaged by the stereo pair 104 to form the stereo imagery, stop at the first object 106 within the event identification area while being real-time imaged by the stereo pair 104 to form the stereo imagery, perform an event (e.g., hand sanitization) in the event identification area while being real-time imaged by the stereo pair 104 to form the stereo imagery, and then walk from the event identification area into the exit area while being real-time imaged by the stereo pair 104 to form the stereo imagery, until not being real-time imaged by or out of sight from the stereo pair 104.

As per FIGS. 1-9, note that the second object 108a walked in a straight line (red line) through the entrance area, the event identification area, and the exit area, without stopping by the first object 106 to engage therewith. As such, the processor 102 would determine that the event involving the first object 106 (e.g., hand sanitization) did not occur or was not identified with respect to the second object 108a. Since the second object 108a may be identified by facial recognition (e.g., a SecurOS Face X) from the stereo imagery captured by the stereo pair 104 or other ways (e.g., biometrics, fingerprints, retina scan, fob), the processor 102 may associate non-occurrence or non-identification of the event with a profile of the second object 108a, as per FIGS. 1-9. For example, recognizing objects can employ a single or multi-factor security systems, as needed. In contrast, the second object 108 walked in a laterally curved line (green line), peaking at the first object 106, through the entrance area, the event identification area, and the exit area, while stopping by the first object 106 to engage therewith. As such, the processor 102 would determine that the event involving the first object 106 (e.g., hand sanitization) did occur or was identified with respect to the second object 108b. Since the second object 108b may be identified by facial recognition from the stereo imagery captured by the stereo pair 104 or other ways (e.g., biometrics, fingerprints, retina scan, fob), the processor 102 may associate occurrence or identification of the event with a profile of the second object 108b, as per FIGS. 1-9.

As explained above, there are various ways to implement the device 100 to be used to analyze behavior of a person on a video, as per FIGS. 1-8. Another way to implement this mode of operation is via the processor 102 when the stereo pair 104 is a pair of IP cameras. As such, there is also the housing 802 hosting the processor 102 and the pair of IP cameras, as per FIG. 8 or other form factors as described above (e.g., a branch of a frame). Note that the housing 802 is optional and the processor 102 and the pair of IP camera can be positioned in different locales. For example, the housing 802 can be optional depending on a size or shape of the area 110. For example, in order to analyze behavior of a person (e.g., the second object 108 with respect to the first object 106) at a large distance, the pair of IP cameras have a correspondingly large stereo base (e.g., a distance between the IP cameras within the pair IP cameras). Programmatically (e.g., executable via the processor 102), there is also a video management system (VMS), a video analytical logical unit (e.g., a module, a function, an object, a pausible engine), and an event processing logical unit (e.g., a module, a function, an object, a pausible engine). The video analytical logical unit includes a frame synchronization logic unit (e.g., a module, a function, an object, a pausible engine), an object detector (e.g., a person, an animal, a pet, a robot) that includes or is based on an ANN (e.g., a CNN, an RNN), an object tracker logical unit (e.g., a module, a function, an object, a pausible engine), an algorithm logical unit (e.g., a module, a function, an object, a pausible engine) that is based on or includes an ANN (e.g., a CNN, a RNN) to skeletize objects (e.g., a person), a 3D reconstruction logical unit (e.g., a module, a function, an object, a pausible engine), an expert system (e.g., a semantic analyzer), and a calibration logic unit (e.g., a module, a function, an object, a pausible engine).

The VMS can be embodied identical or similar to the VMS of FIG. 8.

The video analytical logical unit can be embodied identical or similar to the VMS of FIG. 8.

The event processing logical unit can be embodied identical or similar to the VMS of FIG. 8.

The frame synchronization logic unit synchronizes in real-time a set of frames from the pair of IP cameras (e.g., left and right) of the stereo pair 104, selecting in real-time an optimal pair of frames, which can be in real-time on a frame-by-frame basis, based on a preset criteria (e.g., image quality, resolution, brightness, size, minimal distortion) and transfers in real-time the optimal pair of frames for subsequent processing.

The object detector that includes or is based on the ANN can be programmed to detect the first object 106 or the second object 108. The ANN can be programmed to receive on input a sequence of video frame, where on each of such video frame there is a detection of the first object 106 or the second object 108. For example, the ANN can include an CNN, an RNN, a Mask R-CNN (for object segmentation on images) based on GoogLeNet (inner ANN used in Mask R-CNN), or others.

The object tracker logical unit which solves a technical problem of mapping, matching, relating, corresponding, or otherwise associating people (or other form of objects) between a set of frames on a video. The object tracker logical unit uses a Kalman filter (or an effective recursive filter evaluating a vector state of a dynamic system using a series of incomplete and noisy measurements) to track a particular person and a logic for mapping, matching, relating, corresponding, or otherwise associating, as predicted by a position filter to new detections. The Kalman filter itself can be based on a discrete dynamical system with almost constant velocity. In addition, in order to restore lost tracks, an ANN (e.g., a CNN, an RNN, a Mask R-CNN (for object segmentation on images) based on GoogLeNet (inner ANN used in Mask R-CNN)) may be used to re-identify a person.

The algorithm logical unit that is based on or includes the ANN to skeletize objects may have the ANN an input of which is an RGB frame, and an output of which is a set of key points, as per FIG. 8. For example, when the first object 106 or the second object 108 is a person, the set of key points may include a head, a shoulder, an elbow, a forearm, a leg, a hand or other limbs or features of the person, as virtual skeletized, as per the 3D skeletal model 302 (or several if there are several in a frame) with a set of 2D coordinates therefor as a set of metadata.

The 3D reconstruction logical unit reconstructs a virtual skeleton (e.g., the 3D skeletal model 302) in a 3D space (e.g., the 3D area model 304) of an analyzed scene of the area 110, based on the set of 2D coordinates of the set of key points obtained for the pair of IP cameras (e.g., a synchronous pair from a left camera and a right camera of the stereo pair 104).

The expert system can be embodied identical or similar to the VMS of FIG. 8.

The calibration logic unit is programmed to calibrate or enable calibration of the pair of IP cameras and operationally couple the pair of IP cameras to the area 110. The calibration logic unit allows the user or the operator of the device 100 to calibrate or enable calibration of the stereo pair 104, based on relative positioning of the pair of IP cameras from each other (e.g., a relative position of a left camera to a relative position of a right camera or vice versa). Additionally, the user can use special gestures (e.g., hand gestures) to specify an origin and a set of reference points for inputting into or reading by the semantic analyzer to work, as described above. The processor 102 then link the origin and the set of reference points to the 3D area model 304.

Figure 11:
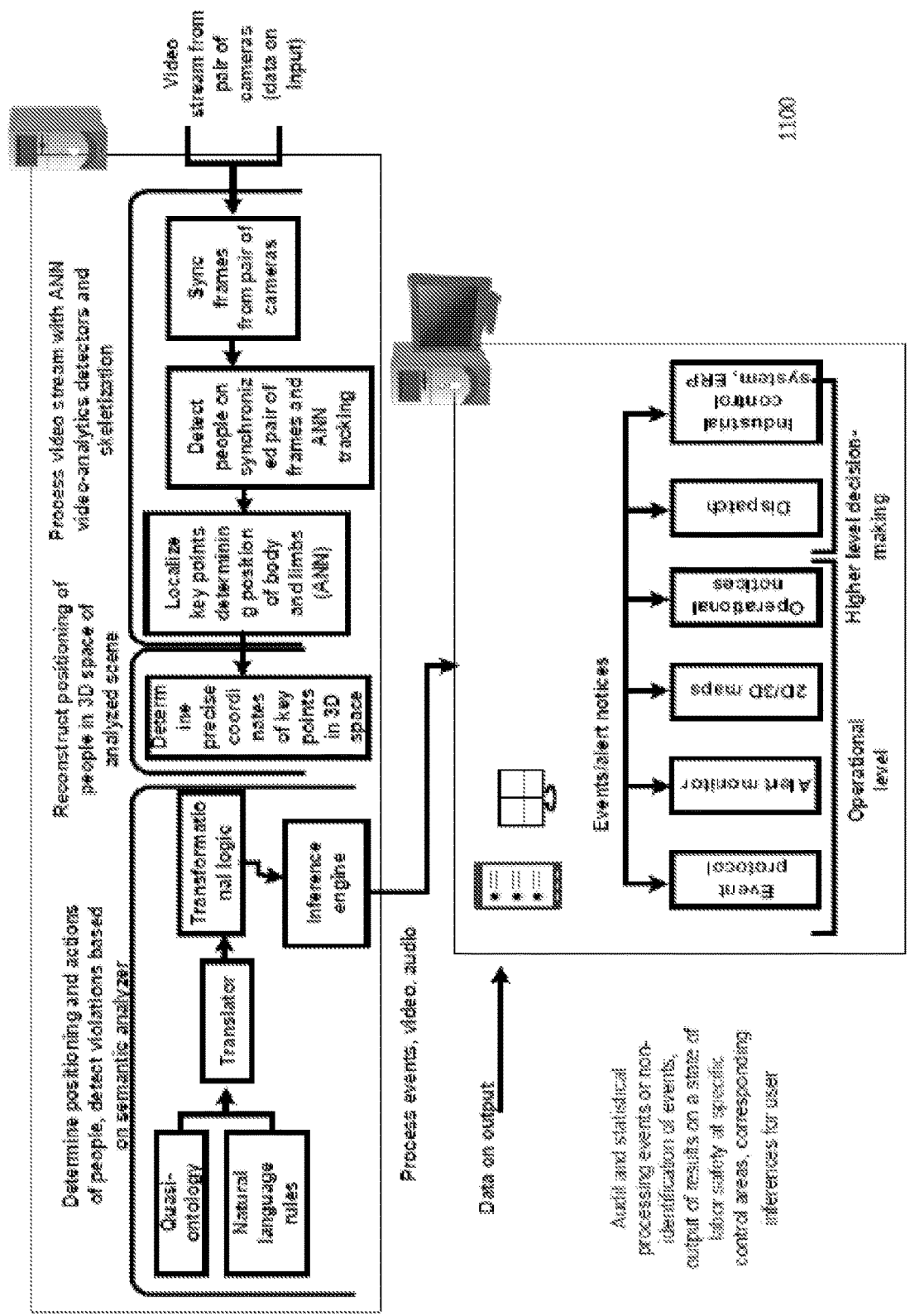
FIG. 11 illustrates an embodiment of a functional block diagram where the device of FIG. 1 has a stereo pair embodied as a pair of cameras according to various principles of this disclosure.

FIG. 11 illustrates an embodiment of a functional block diagram where the device of FIG. 1 has a stereo pair embodied as a pair of cameras according to various principles of this disclosure. In particular, a functional block diagram 100 includes the stereo pair 104 (e.g., a pair of IP cameras), a first block (upper block), and a second block (lower block). The first block corresponds to a logic (a) receiving the stereo imagery from the stereo pair 104, as per FIGS. 1-8, (b) processing the stereo imagery to perform the reconstruction, as per FIGS. 1-8, and (c) the expert system determining whether the event is identified or not identified, as per FIGS. 1-8. For example, the first block can be or include a VMS. The second block corresponds to a logic for decision making based on what the expert system outputs, as per FIGS. 1-8. Note that the first block or the second block can include or be executable via the processor 102.

As illustrated in FIG. 11, for the first block, which can be performed via or caused to be performed via the processor 102, the pair of IP cameras (or non-IP cameras) correspondingly input (e.g., feed) a pair of RGB feeds (e.g., video feeds). The pair of RGB feeds can be used for display in real-time, storage in an archive (e.g., a database), and served to input for a video analytical logic (e.g., a module, a function, an object, a pausible engine). Then, since each of the RGB feeds has a set of image frames (e.g., 2D images), the video analytical logic synchronizes the sets of image frames between each other and forms a set of pairs of image frames (e.g., each pair includes one image frame from one or left camera and one image frame from other or right camera). Then, each pair of image frames from the set of pairs of image frames, as synchronized, is input into an ANN (e.g., a CNN, an RNN) programmed to detect a person (or the first object 106 or the second object 108) on each image frame of each pair of image frames from the set of pairs of image frames. Therefore, the ANN can detect the person on each image frame of each pair of image frames from the set of pairs of image frames. Once the ANN detects the person on each image frame of each pair of image frames from the set of pairs of image frames, the ANN can track movements, which can include poses, orientations, joint bending or joint rotation, of the person on a frame-by-frame basis. Then, such frames are processed by the ANN or another ANN to skeletize the person (e.g., to form a 3D skeletal model), as disclosed herein. For each of the person, as detected in each RGB feed from the pair of RGB feeds captured and fed from the pair of IP cameras, the processor 102 forms a set of 2D coordinates of a set of key points or joints of the person (e.g., a head, a neck, a torso, an arm, a leg, a finger, a toe, an end effector, a limb). Then, for each of the person, based on a pair of sets of 2D coordinates (one for each camera), the processor 102 generates the reconstruction (e.g., a 3D reconstruction) of the set of key points or joints, thereby forming a set of points but now in 3D space (e.g., a 3D skeletal model).

As illustrated in FIG. 11, for the second block, which can be performed via or caused to be performed via the processor 102, there is an expert system, as disclosed herein. The expert system includes a quasi-ontology that lists various object (static and dynamic), containing a markup of a scene by a set of control zones in which these objects can be detected (as disclosed herein), and various predicates representative of a unity of syntactic-semantic templates. For example, the quasi-ontology can be embodied as or include or be included in a file (e.g., an XML file, a JSON file, a flat file, a text file, a delimited file, an array, a tree, a data structure or another data representation). These predicates can be models of natural language sentences that correspond to various basic meanings of verbs or other parts of speech that reflect an essence of an action or a state. For example, for a predicate "bend," a person (or the first object 106 or the second object 108) can bend a limb (e.g., a head, a neck, a torso, an arm, a leg, a finger, a toe, an end effector) and its mathematical-logical representation. For the predicate "bend", if the limb is a leg, then need there may be a virtual angle between a virtual hip and a virtual knee of the person (or the first object 106 or the second object 108). Since a number of basic (e.g., atomic or elemental) meanings is finite, then there may be a corresponding dictionary created.

The unity of syntactic-semantic templates can include a set of natural language rules (e.g., manually input by an operator via a physical or virtual keyboard who is presented a GUI having a text box programmed for a text entry, automatically received from a data source, updated via an update from a remote data source) forming the knowledge base of the expert system. For example, if there is a desire to monitor a certain area A (e.g., the area 110) and activate an alarm (e.g., via a speaker or a display or a message sent to a mobile phone or another mobile device) when a person (or another object) is within the certain area A for a preset time period (e.g., about 5 seconds, about 2 minutes) or more, then a natural language rule can be written in various ways. For example, one of such ways can include a conditional "IF a person is in zone "A" for {more than 5 seconds}, THEN activate an alarm." Note that these natural language rules can also be written based data received from a suitable electronic accessory, as described above, in order to validate, confirm, supplement, augment, or otherwise assist the processor 102 to process or act on more than just the stereo imagery.

Note that there may be a large number of such conditions or conditionals, any of which can be nested or Boolean, as needed via using a GUI programmed to receive natural text, which can be edited therein (although can also be received from another data source). Likewise, there may be various basic (or atomic or elemental) meanings being compounded or forming new more complex meanings in an action section after "THEN", which can act as conditions or conditionals for a set rules of a next level (e.g., a sequence or cascade of events or actions). In this part, there may be recited a description of various deviations from normal or expected behavior or actions of objects or with respect to objects based on various regulations (e.g., legal, business, or situational use cases). There may be a translator logic programmed to translate, based on the quasi-ontology, the natural language, as input or saved, into various suitable structures, instructions, or content, which can be readable and understandable to the inference engine. Resultantly, the translator logic feeds its translations into a transformational logic that can be programmed to output a set of transformational content (e.g., structures, instructions, content, executable code) formed based on the translations from the translator logic. The set of transformational content can be readable and understandable to the inference engine. The inference engine can include a dynamic library written in a programming language that makes an inference or a conclusion about whether a certain behavior occurs or is detected or not. The transformational logic inputs or feeds the set of transformational content, along with real-time metadata, which can include or be sourced from or be based on the set of metadata, the set of modeling metadata, or other metadata, as disclosed herein. Based on such input, the inference engine processing such data and decides whether a particular behavior occurs or is detected. This decision is input or fed into the second block. The second block enables processing of events, as disclosed in context of FIGS. 3-7. For example, various results (events/incidents) received from a video analysis module can be processed by the second block.

Figure 12:
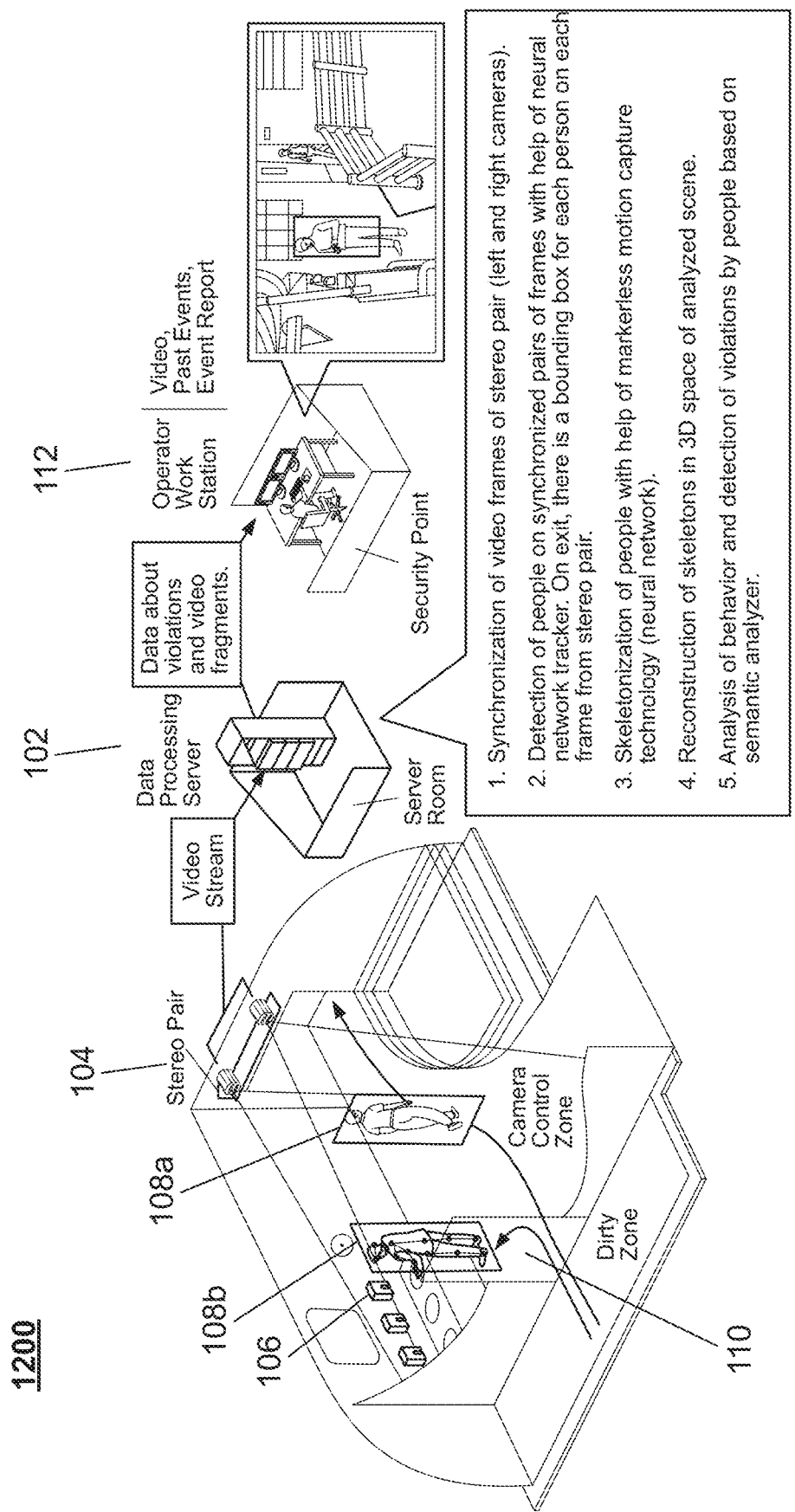
FIG. 12 illustrates an embodiment of a use case for hand sanitizing according to various principles of this disclosure.

FIG. 12 illustrates an embodiment of a use case for hand sanitizing according to various principles of this disclosure. In particular, a use case 1200 includes the area 110 being imaged in real-time by the stereo pair 102 feeding the stereo imagery (e.g., a pair of video streams) to the processor 102 included within a server (or another computing form factor to process the stereo imagery as disclosed herein) in communication with a workstation 112 (e.g., a desktop, a laptop, a smart phone, a tablet, a wearable) operated by an operator in order for the operator to access various data formed based on the processor 102 processing the stereo imagery, as per FIGS. 1-11. For example, such data can include data about violations, videos, or others. Note that the workstation 112 can be receiving data from multiple devices 100.

The processor 102 synchronizes video frames from the stereo pair 104, identifies the second object 108*a* and the second object 108*b* on the video frames using an ANN tracker presenting a respective bounding box enclosing the second object 108*a* and the second object 108*b*, virtually skeletize the second object 108*a* and the second object 108 into a respective 3D skeletal models 302 using markerless motion capture (e.g., an ANN), reconstruct the respective 3D skeletal models 302 in the 3D area model 304 simulating the stereo imagery (e.g., position, posture, movements, orientation) from the stereo pair 104, analyze and detect violations of the second object 108*a* and the second object 108*b* relative to the first object 106 based on the semantic analyzer. Note that the use case 1200 should not be limited hand washing and can be used in other situations with other second objects 108*a* and 108*b* and the first object 106, whether static or dynamic with respect to each other. As evident from FIG. 12, note that the second object 108*a* did not engage with the first object 106, as captured in the stereo imagery from the stereo pair 104 and identified by the processor 102, as per FIGS. 1-11. In contrast, similar to what is explained above, the second object 108*b* did engage with the first object 106, as captured in the stereo imagery from the stereo pair 104 and identified by the processor 102, as per FIGS. 1-11. As such, as per FIGS. 1-11, the use case 1200 detected by a "hand sanitizing" system can be embodied as the device 100. If a person (the second object 108*a* and the second object 108*b*) entered from the entrance area (e.g., a dirty zone) of the area 110, then the person walks to the event identification area (e.g., a hand sanitizing zone), bring his/her hands alternately to the first object 106 (e.g., a sanitizer housing, a faucet), and make certain hand movements at a given distance from the first object 106 for certain periods of time, as tracked via the processor 102 from the 3D skeletal model 302 being sequenced, posed, oriented, timed, and positioned accordingly, as per FIGS. 1-12. If this set of actions is not identified or not identifiable, then the processor 102 detects a violation and send a corresponding notification to the operator at the workstation 112.

Figure 13:
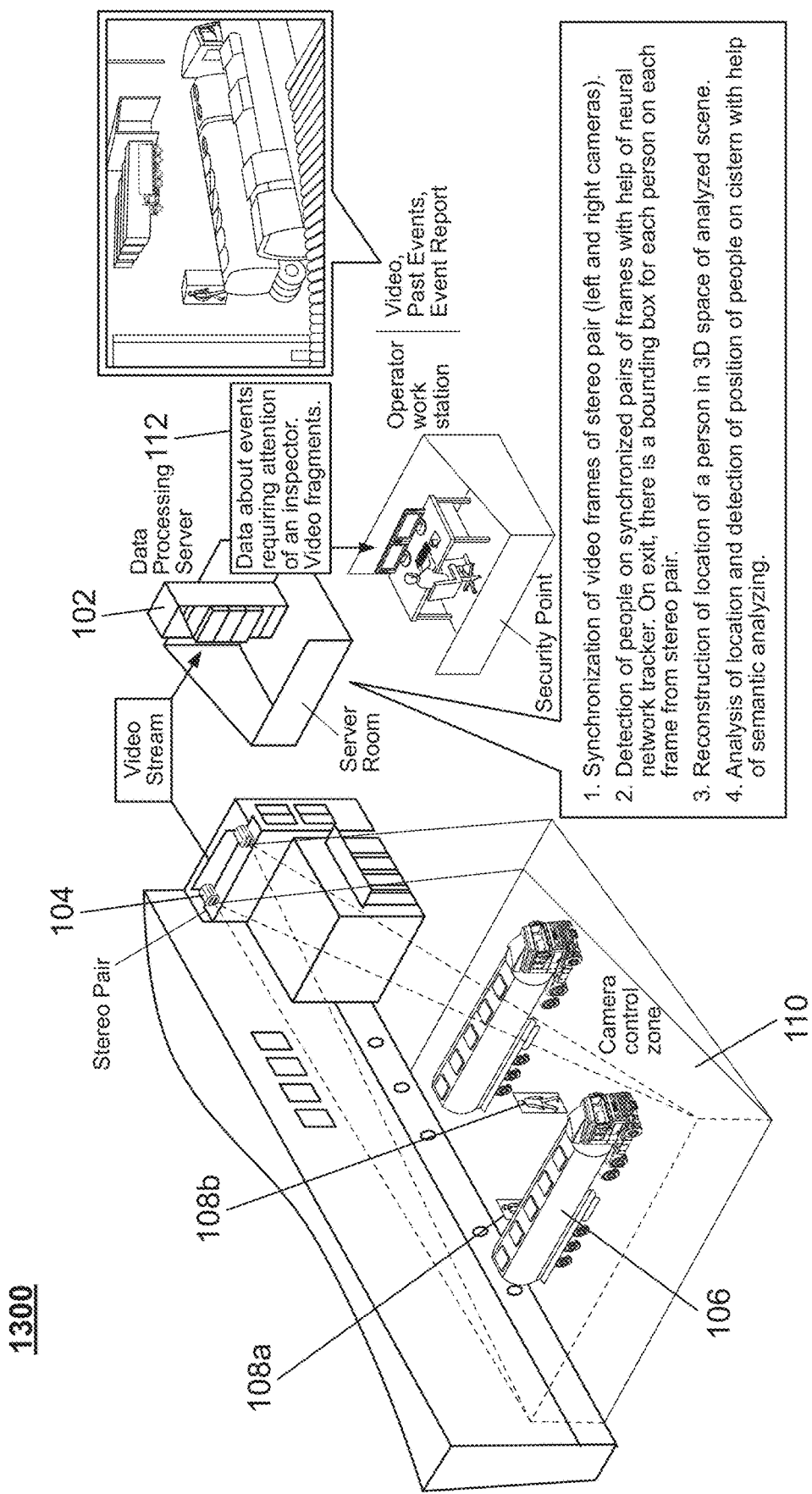
FIG. 13 illustrates an embodiment of a use case for presence where not allowed according to various principles of this disclosure.

FIG. 13 illustrates an embodiment of a use case for presence where not allowed according to various principles of this disclosure. In particular, a use case 1300 is similar to the use case 1200. However, there are some differences. For example, in the use case 1300, in addition to virtually skeletizing, the processor 102 reconstructs the second object 108*a* and the second object 108*b* as respective 3D skeletal models 302 in the 3D area model 304, which may include simulating the second object 108*a* and the second object 108*b* in the area 110 based on the stereo imagery (e.g., position, posture, movements, orientation) from the stereo pair 104, analyzes positioning of the 3D skeletal models in the 3D area model, i.e., the second object 108*a* standing on the first object 106 and the second object 108*b* not standing on the first object 106. Further, the first object 106 in the use case 1300 is movable (e.g., a land vehicle, a cistern, a storage tank) whereas the first object 106 in the use case 1200 is fixed. Also, in the use case 1300, the stereo pair 104 is significantly vertically raised (e.g., 5, 10, 15 meters) over the area 110 and significantly horizontally spaced apart from the first object 106 (e.g., 10, 15, 20 meters), unlike the use case 1300. As such, in the use case 1300, the processor 102 processes the stereo imagery from the stereo pair 104, as per FIGS. 1-12, and detects a presence of the second object 108*a* on the first object 106, writes such data in an event log, and sends an alert about a particularly important event to attract an attention of the operator operating the workstation 112, as per FIGS. 1-12. Note that processing of video data from a synchronized stereo pair of cameras (e.g., the stereo pair 104) enables determination of exact coordinates of an object in a three-dimensional space.

Figure 14:
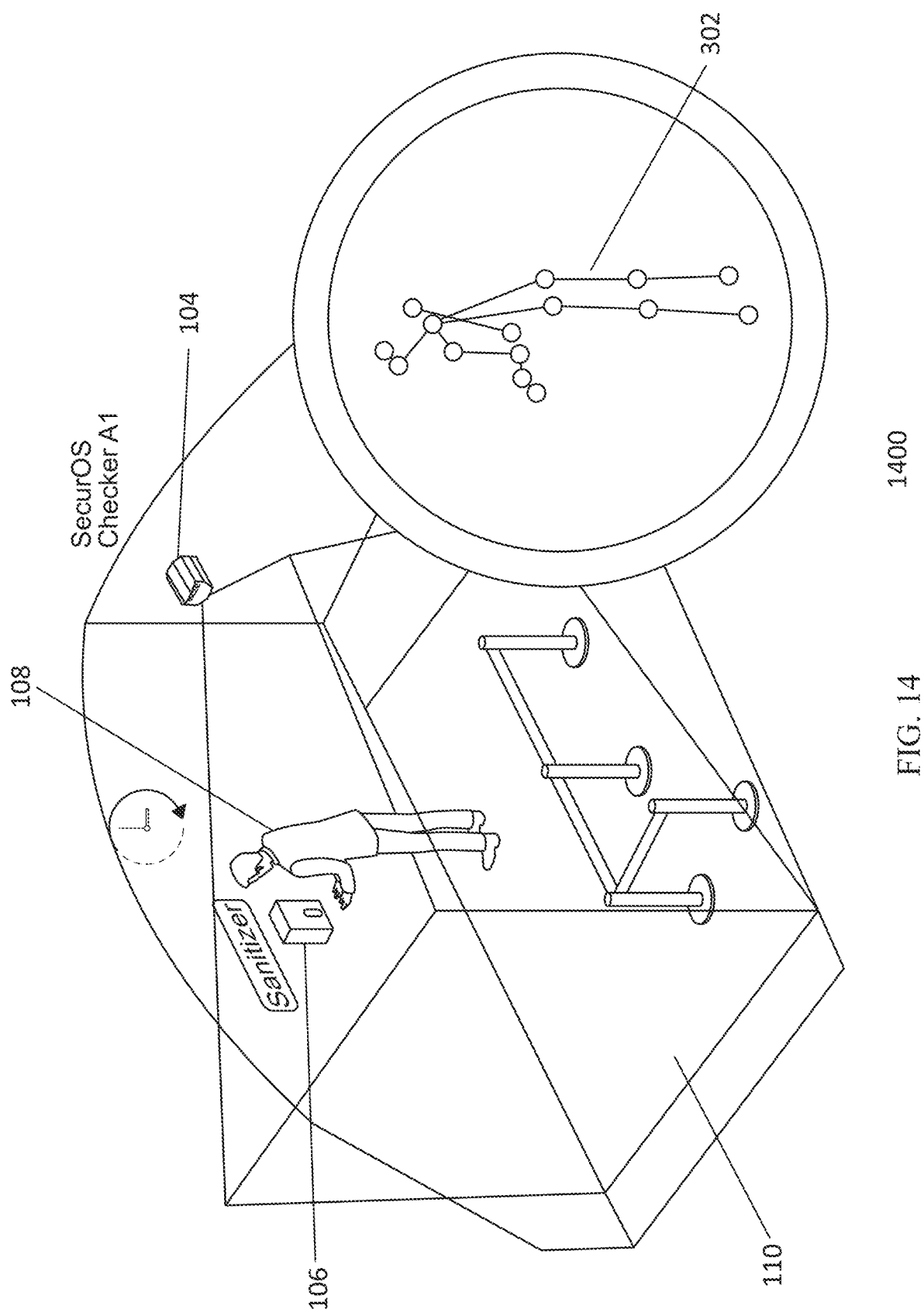
FIG. 14 illustrates an embodiment of a first object being engaged with a second object identified by the device of FIG. 1 according to various principles of this disclosure.

FIG. 14 illustrates an embodiment of a first object being engaged with a second object identified by the device of FIG. 1 according to various principles of this disclosure. In particular, as per FIGS. 1-13, a situation 1400 includes the area 110 where the stereo pair 104 is real-time imaging the second object 108 engaging with the first object 106 for a preset time period (e.g., less than 1 minute, 45 seconds, 30 seconds, although other time periods can be used for other scenarios as disclosed herein). Note that the 3D skeletal model 302 is sequenced, posed, oriented, timed, and positioned accordingly.

Figure 15:
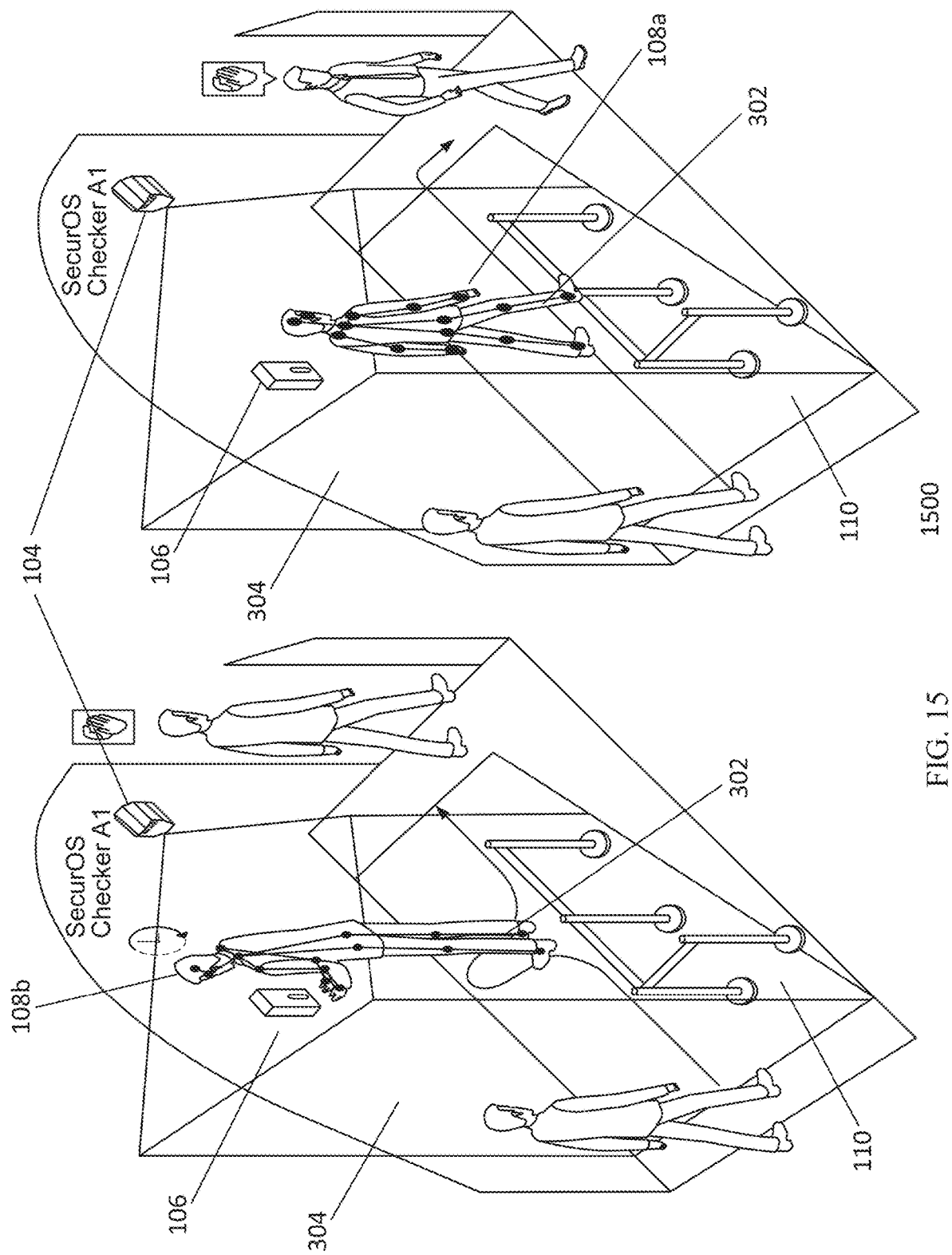
FIG. 15 illustrates an embodiment of a pair of events identified by the device of FIG. 1 according to various principles of this disclosure.

FIG. 15 illustrates an embodiment of a pair of events identified by the device of FIG. 1 according to various principles of this disclosure. In particular, as per FIGS. 1-14, a situation 1500 includes the area 110 where the second object 108a did not engage with the first object 106, as determined by the processor 102 from the stereo imagery sourced from the stereo pair 104. For example, the second object 108a has the 3D skeletal model 302 within the 3D area model 304 sequenced, posed, oriented, timed, and positioned indicative of the second object 108a not engaging with the first object 106, as determined by the processor 102 from the stereo imagery sourced from the stereo pair 104. For example, such indication can be based on the second object 108a walking by without engaging the first object 106 or improperly engaging with the first object 106, as determined by the processor 102 from the stereo imagery sourced from the stereo pair 104. For example, the processor 102 can determine this based on improper at least one of sequencing, positing, orienting, timing, positioning, or other characteristics indicative of the second object 108a not engaging with the first object 106.

In contrast, note that the second object 108b has the 3D skeletal model 302 within the 3D area model 304 sequenced, posed, oriented, timed, and positioned indicative of the second object 108a engaging with the first object 106, as determined by the processor 102 from the stereo imagery sourced from the stereo pair 104. For example, the 3D skeletal model 302 can have virtual limbs that are sequenced, posed, oriented, timed, and positioned to indicate engagement with the first object 106. As such, the second object 108a would cause a notification indicative of a non-identification of the event to be sent to the operator of the workstation 112. Likewise, the second object 108b would cause a notification indicative of an identification of the event to be sent to the operator of the workstation 112. If the second object 108a or the second object 108b are recognized (e.g., facial, biometric, retina, fob), then the notification can be associated or written into a profile corresponding to the second object 108a or the second object 108b.

Figure 16:
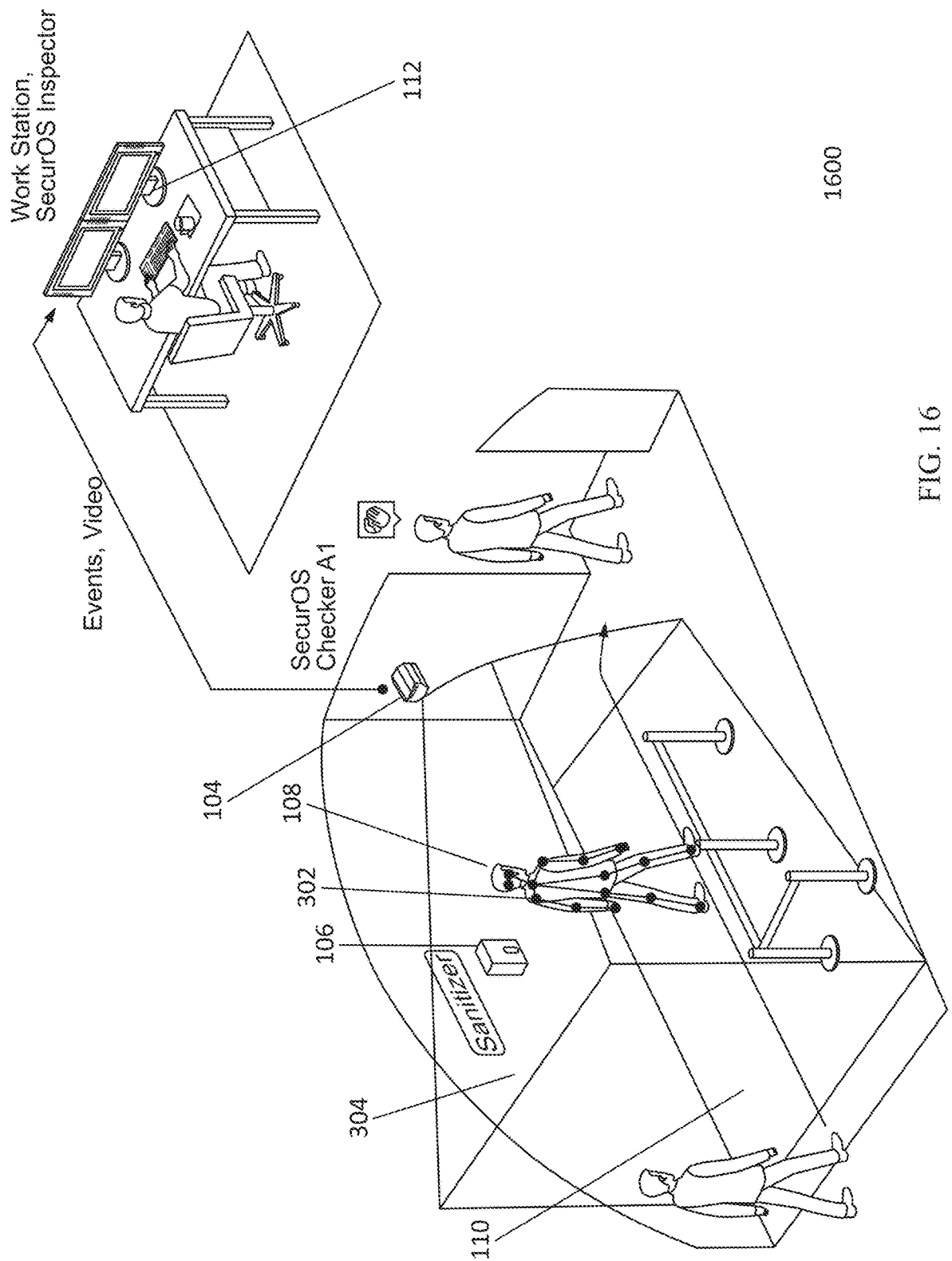
FIG. 16 illustrates an embodiment of a first object not being engaged with a second object identified by the device of FIG. 1 according to various principles of this disclosure.

FIG. 16 illustrates an embodiment of a first object not being engaged with a second object identified by the device of FIG. 1 according to various principles of this disclosure. In particular, a situation 1600 includes the area 110 where the second object 108a did not engage with the first object 106 as determined by the processor 102 from the stereo imagery sourced from the stereo pair 104. Note that the second object 108a has the 3D skeletal model 302 within the 3D area model 304 sequenced, posed, oriented, timed, and positioned indicative of the second object 108a not engaging with the first object 106, as determined by the processor 102 from the stereo imagery sourced from the stereo pair 104. As such, the second object 108a would cause a notification indicative of a non-identification of the event to be sent to the operator of the workstation 112. If the second object 108 is recognized from the stereo pair 104 (or otherwise), then the notification can be associated or written into a profile corresponding to the second object 108a or the second object 108b.

Figure 17:
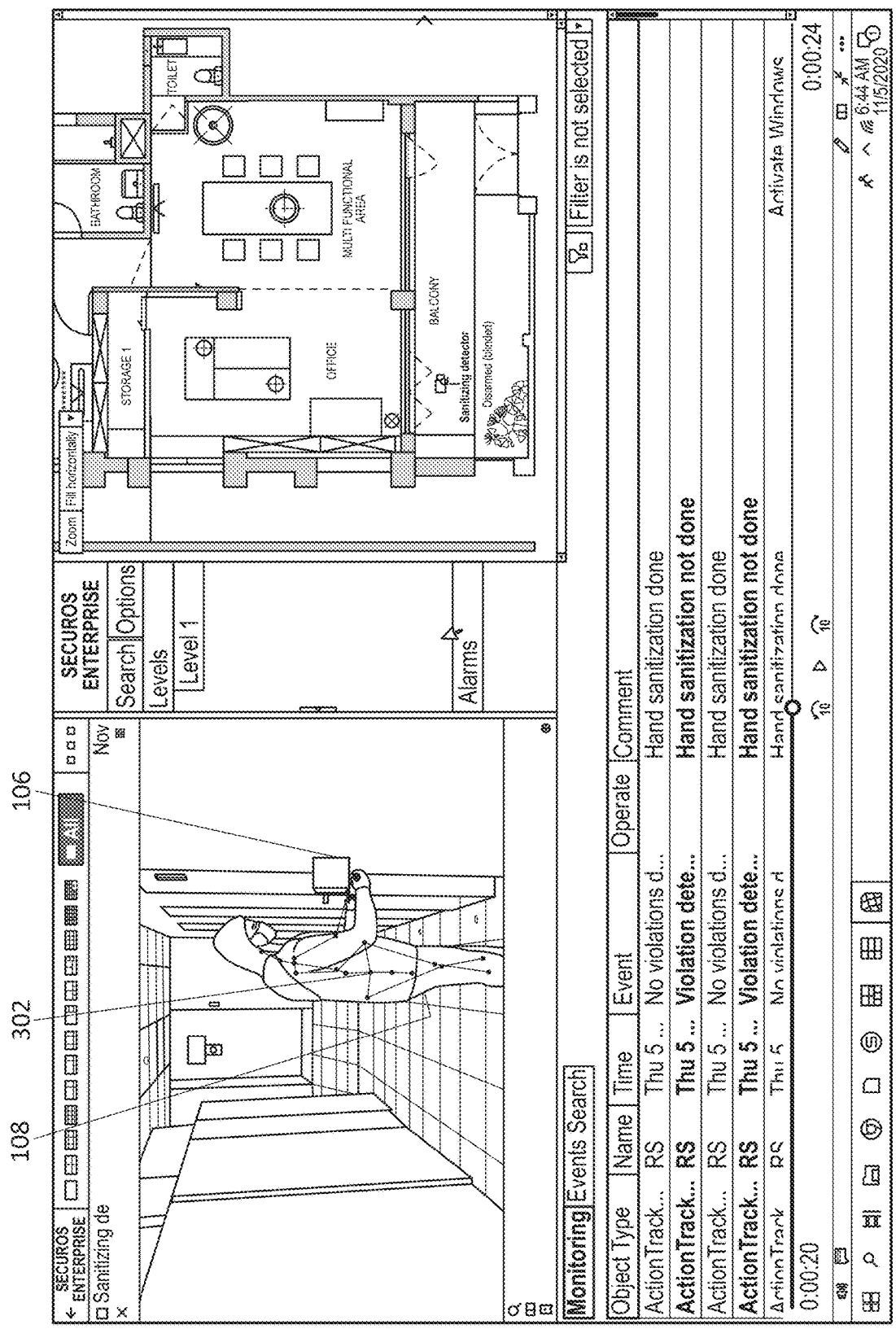
FIG. 17 illustrates an embodiment of a screenshot of a GUI of a log showing a pane depicting a first object being engaged with a second object identified by the device of FIG. 1 according to various principles of this disclosure.

FIG. 17 illustrates an embodiment of a screenshot of a GUI of a log showing a pane depicting a first object being engaged with a second object identified by the device of FIG. 1 according to various principles of this disclosure. In particular, a screenshot 1700 depicts a video pane, an overview pane, and a list of events pane. The video pane depicts the stereo imagery from the stereo pair 104 processed by the processor 102, as per FIGS. 1-16. The stereo imagery depicts the second object 108 engaging with the first object 106. The stereo imagery depicts a segment enclosing the second object 108 identified in the stereo imagery. The 3D skeletal model 302 is overlaid over the segment to simulate in real-time the second object 108 in pose, orientation, time, and position indicative of the second object 108a engaging with the first object 106, as determined by the processor 102 from the stereo imagery sourced from the stereo pair 104. The overhead pane depicts an overhead map pinpointing where the first object 106 is positioned or where the stereo pair 104 is imaging or where the second object 108 is positioned at that time. The map can be updated based on the stereo imagery from the stereo pair 104 (or other stereo pairs or data sources) as processed by the processor 102. The list of events pane lists a list of events identified or not identified by the processor 102, as per FIGS. 1-17. The processor 102 can update the list of events in real-time based on the stereo imagery from the stereo pair 104 (or other stereo pairs or data sources).

Figure 18:
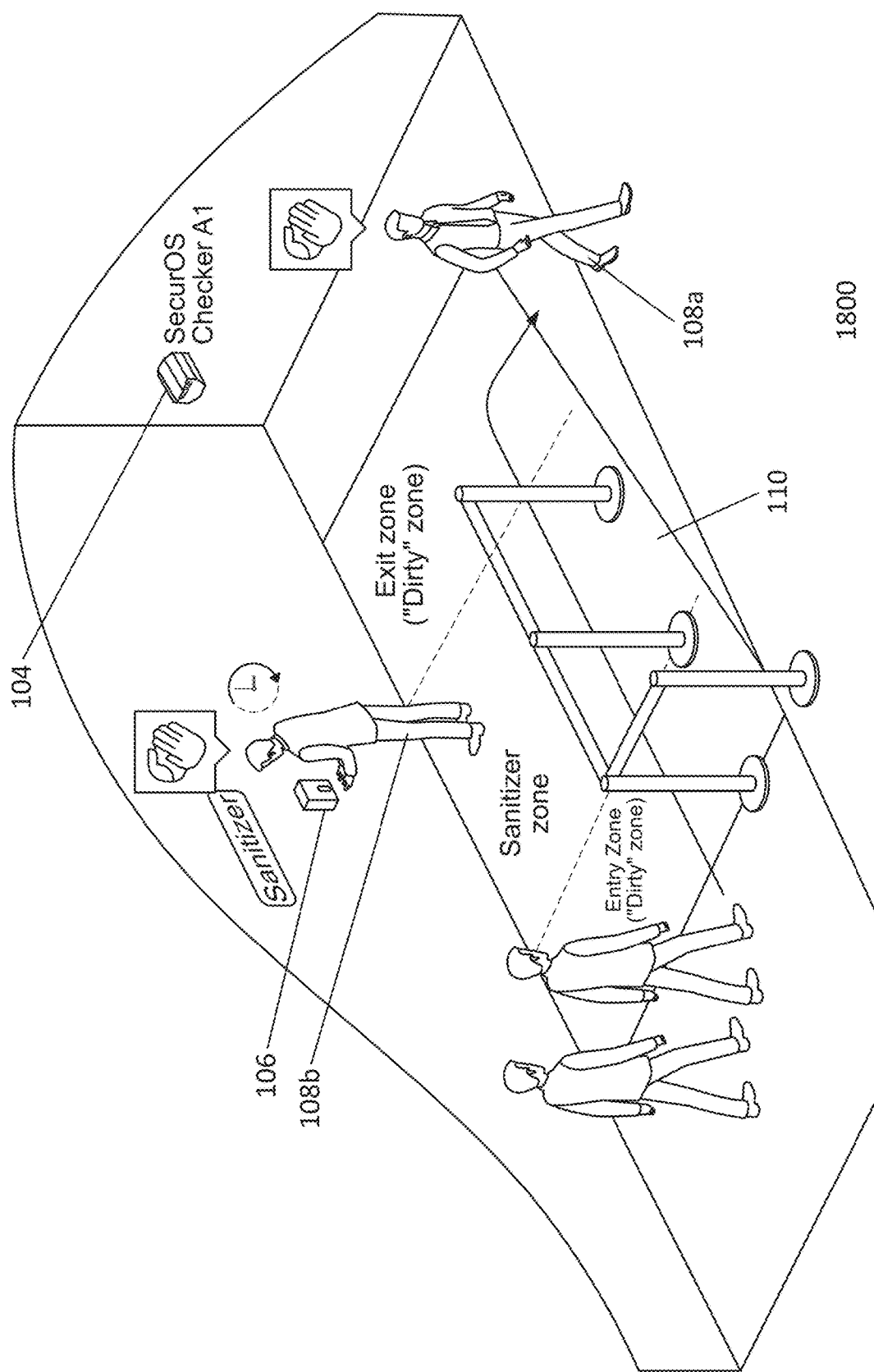
FIG. 18 illustrates an embodiment of a pair of events identified by the device of FIG. 1 according to various principles of this disclosure.

FIG. 18 illustrates an embodiment of a pair of events identified by the device of FIG. 1 according to various principles of this disclosure. In particular, a situation 1800 includes the area 100 segmented into the entrance area (e.g., a dirty zone), the event identification area (e.g., a hand sanitization zone), and the exit area (e.g., a clean zone), as per FIGS. 1-17. The second object 108a walked by the event notification area without being imaged to engage the first object 106. In contrast, the second object 108a walked by the event notification area and was imaged to engage the first object 106, as per FIGS. 1-17.

Figure 19:
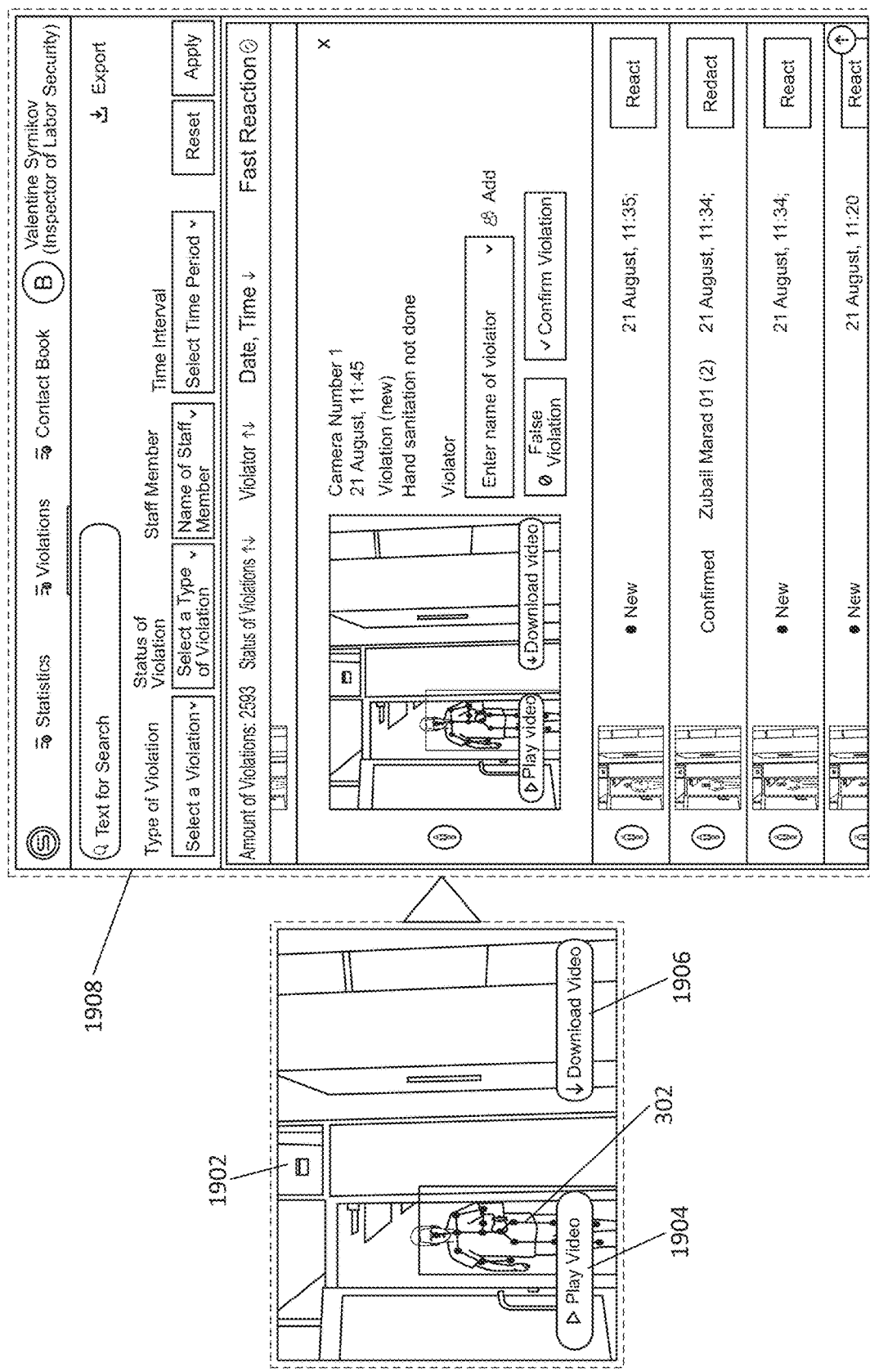
FIG. 19 illustrates an embodiment of a screenshot from a GUI of a log depicting an entry being retrieved according to various principles of this disclosure

FIG. 19 illustrates an embodiment of a screenshot from a GUI of a log depicting an entry being retrieved according to various principles of this disclosure. In particular, a screenshot 1900 includes a thumbnail image 1902 captured from the stereo imagery sourced from the stereo pair 104, as per FIGS. 1-19. The thumbnail image 1902 is retrieved from a log of events 1908 upon selection of a record corresponding to the event or a non-identification of the event. The thumbnail image 1902 is presented underneath a button 1904 such that the button 1904 is overlaid over the thumbnail image 1902 in order to play a video from which the thumbnail image 1902 was captured when the button 1904 is pressed, although the button 1904 can be embedded into the video as well. The thumbnail image 1902 is presented underneath a button 1906 such that the button 1906 is overlaid over the thumbnail image 1902 in order to cause an initiation of a download of a video from which the thumbnail image 1902 was captured when the button 1906 is pressed, although the button 1906 can be embedded into the video as well. Note that the thumbnail image 1902 has the 3D skeletal model 302 shown therein, embedded thereinto, or overlaid thereover.

Figure 20:
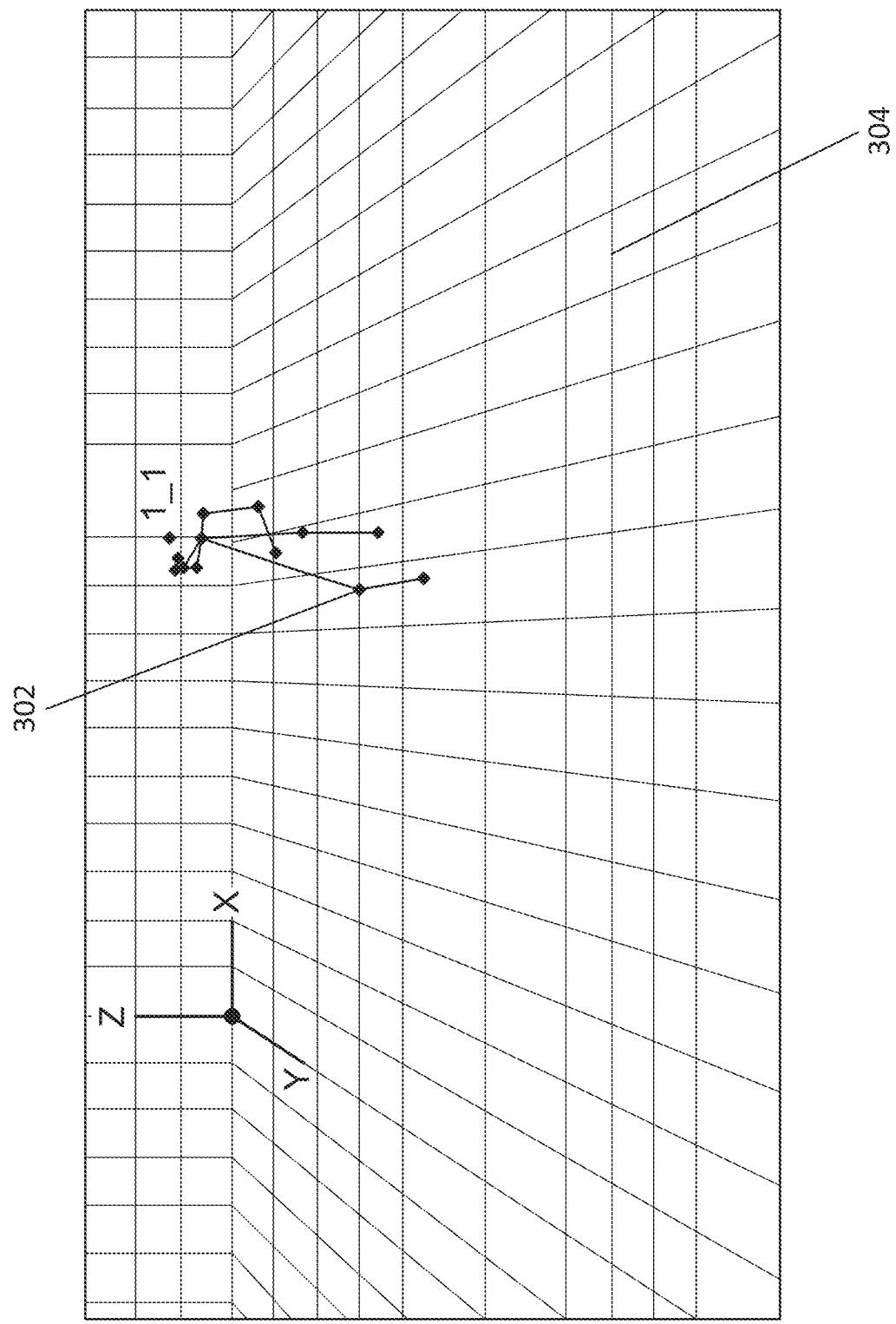
FIG. 20 illustrates an embodiment of a 3D skeletal model within a 3D area model according to various principles of this disclosure.

FIG. 20 illustrates an embodiment of a 3D skeletal model within a 3D area model according to various principles of this disclosure. In particular, a situation 2000 includes the 3D skeletal model 302 within the 3D area model 304. Note that the 3D area model is 304 is dimensional simulating the area 110. As such, the 3D model area 304 has a set of addressable virtual spaces in order to track the 3D skeletal model 302 therein.

Figure 21:
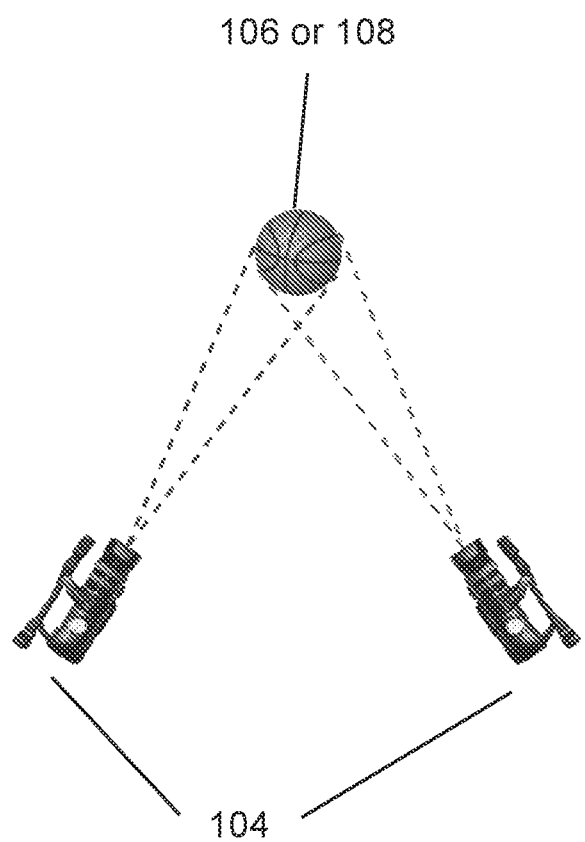
FIG. 21 illustrates an embodiment of a stereo pair of FIG. 1 imaging an object positioned within an area according to various principles of this disclosure.

FIG. 21 illustrates an embodiment of a stereo pair of FIG. 1 imaging an object positioned within an area according to various principles of this disclosure. Note that the stereo pair 104 contains a pair of cameras (e.g., optical, thermal) correspondingly having a pair of imaging fields (e.g., optical, thermal) and the first object 106 or the second object 108 positioned within the area 110 is located where the pair of imaging fields intersect with each other.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

The invention claimed is:

1. A device, comprising:
a processor programmed to:
access, in real-time, a stereo imagery of an area including a first object and a second object engaging with the first object;
form, in real-time, a reconstruction of the second object in the area based on the stereo imagery, wherein the reconstruction including a 3D area model and a 3D skeletal model within the 3D area model, wherein the 3D area model simulating the area, wherein the 3D skeletal model simulating the second object in the area;
identify, in real-time, a set of virtual movements of the 3D skeletal model in the 3D area model, wherein the set of virtual movements simulating the second object engaging with the first object;
identify, in real-time, a set of atomic movements of the 3D skeletal model corresponding to the set of virtual movements;
identify, in real-time, an event semantically defined by an expert system as a combination of at least two atomic movements of the set of atomic movements; and
take, in real-time, an action responsive to the event being identified.

2. The device of claim 1, wherein the second object including a real limb, wherein the 3D skeletal model including a virtual limb simulating the real limb, wherein the set of virtual movements including a virtual movement of the virtual limb, wherein the set of atomic movements including an atomic movement of the virtual limb, wherein the processor is further programmed to identify, in real-time, the set of atomic movements based on the atomic movement of the virtual limb corresponding the virtual movement of the virtual limb.

3. The device of claim 2, wherein the atomic movement of the virtual limb including a bending of the virtual limb according to a preset rule.

4. The device of claim 3, wherein the real limb is a real hand, wherein the first object is a sanitizing station, wherein the second object engaging with the first object includes the second object sanitizing the real hand at the sanitizing station, wherein the event is a hand sanitizing event.

5. The device of claim 3, wherein the first object is a first person having a first real hand, wherein the second object is a second person having a second real hand corresponding to the real limb, wherein the second object engaging with the first object including the second real hand shaking the first real hand, wherein the event is a hand shaking event.

6. The device of claim 1, wherein the set of atomic movements is a first set of atomic movements, wherein the event is further defined by a second set of atomic movements of the 3D skeletal model corresponding to the set of virtual movements, wherein the processor is further programmed to identify, in real-time, the event based on the first set of atomic movements and the second set of atomic movements.

7. The device of claim 1, wherein the second object having a pose in the area, wherein the second object including a real limb in the area, wherein the processor is further programmed to form, in real-time, the 3D skeletal model from the pose based on the stereo imagery and from how the real limb is positioned in the area based on the stereo imagery.

8. The device of claim 7, wherein the processor is further programmed to identify, in real-time, the set of atomic movements based on the 3D skeletal model simulating the pose and how the real limb is positioned in the area.

9. The device of claim 1, wherein the second object has a real face, wherein the stereo imagery depicts the real face, wherein the processor is further programmed to perform, in real-time, a recognition of the real face based on at least an image of the stereo imagery, wherein the action is based on the recognition, wherein the image depicts the real face.

10. The device of claim 9, wherein the action is a first action, wherein the processor is further programmed to take a second action responsive to the event not being identified, wherein the second action is based on the recognition.

11. The device of claim 10, wherein the second action includes adding an identifier of the second object associated with the real face to a list of identifiers not associated with the event.

12. The device of claim 1, wherein the processor is further programmed to modify, in real-time, a log for each occurrence of the event being identified and the event not being identified, wherein each of the occurrences includes an identifier of the second object.

13. The device of claim 1, wherein the processor is further programmed to retrieve a record with a set of information for the event not being identified responsive to a request from a user input device.

14. The device of claim 13, wherein the set of information includes at least a user interface element programmed to retrieve or play a portion of the stereo imagery.

15. The device of claim 1, wherein the processor is further programmed to access a log containing a set of information for the event being identified and the event not being identified responsive to a request from a user input device, and export a subset of the set of information for a preset time period responsive to the request from the user input device.

16. The device of claim 1, wherein the processor is further programmed to generate a dashboard based on a set of information for the event being identified and the event not being identified responsive a request from a user input device, and instruct a display to output the dashboard responsive to the request from the user input device.

17. The device of claim 1, further comprising:
a next unit of computing (NUC) apparatus including the processor; and
a housing including a pair of video cameras forming a stereo pair sourcing the stereo imagery.

18. The device of claim 1, wherein the action is a first action, wherein the processor is programmed to take a second action responsive to the event not being identified.

19. The device of claim 18, wherein the processor is further programmed to access an identifier for the second object, wherein each of the first action and the second action involves the identifier.

20. The device of claim 18, wherein the second action includes requesting an output device to output an alert, an alarm, or a notice indicative of the event not being identified.

21. The device of claim 20, wherein the output device is a display.

22. The device of claim 20, wherein the output device is a speaker.

23. The device of claim 20, wherein the stereo imagery is sourced from a source, wherein the output device is remote from the source.

24. The device of claim 20, wherein the stereo imagery is sourced from a source, wherein the output device is local to the source.

25. The device of claim 20, wherein the first object is a static object and the second object is a dynamic object.

26. The device of claim 20, wherein the first object is a dynamic object and the second object is a dynamic object.

27. The device of claim 1, wherein the stereo imagery is markerless motion capture.

28. The device of claim 1, wherein the expert system is programmed to employ a natural language to define the event as the combination of the at least two atomic movements of the set of atomic movements.

29. The device of claim 1, wherein the stereo imagery includes a set of depth metadata, wherein the expert system is programmed to process the set of depth metadata to define the event.

30. A method, comprising:
accessing, via a processor, in real-time, a stereo imagery of an area including a first object and a second object engaging with the first object;
forming, via the processor, in real-time, a reconstruction of the second object in the area based on the stereo imagery, wherein the reconstruction including a 3D area model and a 3D skeletal model within the 3D area model, wherein the 3D area model simulating the area, wherein the 3D skeletal model simulating the second object in the area;
identifying, via the processor, in real-time, a set of virtual movements of the 3D skeletal model in the 3D area model, wherein the set of virtual movements simulating the second object engaging with the first object;
identifying, via the processor, in real-time, a set of atomic movements of the 3D skeletal model corresponding to the set of virtual movements;
identifying, via the processor, in real-time, an event semantically defined by an expert system as a combination of at least two atomic movements of the set of atomic movements; and
taking, via the processor, in real-time, an action responsive to the event being identified.

31. The method of claim 30, wherein the expert system is programmed to employ a natural language to define the event as the combination of the at least two atomic movements of the set of atomic movements.

32. The method of claim 30, wherein the stereo imagery includes a set of depth metadata, wherein the expert system is programmed to process the set of depth metadata to define the event.

* * * * *